United States Patent [19]
Wakabayashi et al.

[11] Patent Number: 5,905,255
[45] Date of Patent: May 18, 1999

[54] OBJECTIVE LENS DRIVER

[75] Inventors: Kanji Wakabayashi, Kyoutosi; Hitoshi Fujii, Hirakatasi; Hiroshi Yamamoto, Yawatasi; Jouji Anzai, Osakashi; Yasumasa Shibata, Hirakatashi, all of Japan

[73] Assignee: Matsushita Electric Industrial Co., Ltd., Japan

[21] Appl. No.: 09/007,145

[22] Filed: Jan. 14, 1998

[30] Foreign Application Priority Data

Jan. 14, 1997 [JP] Japan ..................................... 9-004895
Oct. 16, 1997 [JP] Japan ..................................... 9-283824

[51] Int. Cl.$^6$ ..................................................... G02B 7/04
[52] U.S. Cl. .................... 250/201.5; 359/824; 369/44.22
[58] Field of Search .............................. 250/201.5, 201.1, 250/201.2; 359/814, 822, 824; 369/44.15, 44.21, 44.22

[56] References Cited

U.S. PATENT DOCUMENTS 5,319,497  6/1994  Wakabayashi et al. ............... 250/201.5
5,703,730  12/1997  Yomoda ................................. 250/201.5

FOREIGN PATENT DOCUMENTS 4-366429  12/1992  Japan.
6-162540  6/1994  Japan.

Primary Examiner—Que T. Le
Assistant Examiner—Kevin Pyo
Attorney, Agent, or Firm—Parkhurst & Wendel

[57] ABSTRACT

In a objective lens driver, at least one permanent magnet is mounted on a movable member, and plural yokes, each being wound with a coil having its winding axis in the focusing direction, are disposed facing the permanent magnet. The yokes are arranged almost symmetrically about a plane including the center of gravity of the movable member and being perpendicular to the tracking direction. In this structure, even when the movable member moves in the tracking direction, since the permanent magnet (a magnetic field source) also moves with the movable member, the distribution of magnetic flux density that contributes to the drive also shifts according to the movement of the movable member, so that the distribution of magnetic flux density maintains being almost symmetrical about the center of gravity of the movable member. Accordingly, in tilt drive, a constant sensitivity to tilt drive is obtained regardless of the position of the movable member. Further, since the rotation axis of tilt drive is fixed, there arises no crosstalk of displacement in the focusing direction and the tracking direction. Furthermore, since the point of action of driving force on the movable member is fixed, there arises no crosstalk of angular displacement in the tilt direction due to focusing drive and tracking drive. Consequently, stable focusing control, tracking control and tilt correction control are realized in an objective lens driver capable of correcting a tilt.

18 Claims, 17 Drawing Sheets

OBJECTIVE LENS DRIVER

FIELD OF THE INVENTION

The present invention relates to an objective lens driver employed in an apparatus for optically recording and/or reproducing information in recording media.

BACKGROUND OF THE INVENTION

In order to correct focusing error due to vertical motion of a disk-type recording medium (hereinafter referred to simply as "disk") such as a compact disk, tracking error due to decentration, or a tilt of an objective lens relative to the disk, an objective lens driver drives the objective lens in two axes, i.e., the direction perpendicular to the disk (hereinafter referred to as "focusing direction") and the radial direction of the disk (hereinafter referred to as "tracking direction"). It is to be noted that the focusing direction is the direction perpendicular to the disk and the tracking direction is the radial direction of the disk on the premise that the disk loaded on the driver is in ideal shape having no curvature and no decentration.

In an optical recording/reproduction apparatus including such an objective lens driver, in order to increase the recording capacity, recording and reproduction are carried out with a converging spot of reduced diameter using an objective lens of high numerical aperture. In this case, since the degree of aberration attendant on a tilt of the objective lens relative to the disk increases in proportion to third power of the numerical aperture, positioning of the optical axis of the objective lens relative to the disk must be precisely performed to obtain satisfactory recording/reproduction signals.

For this purpose, the conventional optical recording/reproduction apparatus is equipped with a tilt correction controller for correcting a tilt by inclining the whole optical head using a DC motor or the like.

However, the tilt correction controller has the following drawbacks. Since this means can correct only angle errors of low frequencies, it is difficult to reduce aberration. In addition, since a mechanism for inclining the whole optical head is added, the size of the optical recording/reproduction apparatus is increased. Further, since it is very difficult to match the rotation center at the tilt correction with the principal point of the objective lens because of lack of space, the height of the objective lens significantly varies with the rotation and, therefore, some means for adjusting the height is needed, resulting in a further increase in the size of the apparatus. It is to be noted that the principal point of the objective lens is a point on the optical axis of the objective lens (shown by 100 in FIG. 9(b)), and a distance between this point and the focal point is the focal length.

Meanwhile, Japanese Published Patent Application No. Hei. 4-366429 discloses an objective lens driver that detects a relative tilt of the disk and the optical axis of the objective lens and rapidly corrects the tilt.

Hereinafter, the objective lens driver disclosed will be described in detail.

This objective lens driver is equipped with an objective lens for focusing a light beam on an optical information recording medium; a holder for holding the objective lens; a supporter for supporting the holder movably in the focusing direction and tiltably to the focusing direction; a plurality of driving coils for moving the objective lens in the focusing direction and tilting the objective lens to the focusing direction by driving the holder in response to voltages applied thereto, which coils are disposed on the holder individually and symmetrically about the center line of the objective lens; and a magnet for generating a force for driving the holder between itself and the driving coils, which magnet is fixed onto the supporter.

The objective lens driver is so constructed operates as follows. It is assumed that the objective lens driver includes four driving coils, and the four driving coils are arranged, two by two, symmetrically about a plane including the center line of the objective lens and being perpendicular to the tracings direction. In this case, when the respective driving coils are supplied with currents of the same value in the same direction, the objective lens moves in the focusing direction without tilting to the focusing direction, whereby focusing control is carried out.

When an arbitrary current is applied to two of the four driving coils performing focusing control in response to the currents of the same value in the same direction, which two coils are disposed on either side of the plane including the center line of the objective lens and being perpendicular to the tracking direction, a portion of the of the holder having the driving coils supplied with the arbitrary current moves up or down in response to the current, i.e., the holder tilts to the focusing direction. Since the objective lens can be tilted to the focusing direction as described above, it is possible to correct a tilt of the optical axis of the objective lens to the disk.

Accordingly, a mechanism and a motor for tilting the whole optical head are dispensed with, resulting in a small-sized optical recording/reproduction apparatus capable of high-speed tilt correction.

In the objective lens driver described above, however, since the magnetic circuit for generating the operating force of the driving coils, i.e., the magnet and the supporter, is fixed, the current driving sensitivity in the tilt correction varies with the motion of thee holder in the focusing direction or the tracking direction. The reason is as follows. Usually, the magnetic flux density distribution in a void of the magnetic circuit has a shape like a mountain and, therefore, the amount of the magnetic flux interlinked with each driving coil varies when the position of the driving coil relative to the magnetic circuit varies.

Accordingly, the driving sensitivity in the tilt correcting direction varies according to the position of the holder, so that the stability of tilt correction control is degraded.

Furthermore, the rotation center in the tilt correction varies with the holder's moving in the focusing direction or the tracking direction. The reason is as follows. Since the magnetic flux density distribution in a magnetic void part of the magnetic circuit has a shape like a mountain as described above and, therefore, the relative position of the holder and the point of action of the driving force varies when the position of the driving coil relative to the magnetic circuit varies.

Since the rotation center in the tilt correction varies according to the position of the holder, the position of the objective lens in the focusing direction or the tracking direction varies due to the tilt correction, and the amount of the variation varies according to the position of the holder. Thereby, the control precision is degraded in focusing or tracking control.

Furthermore, when the holder moves in the focusing direction or the tracking direction, i.e., when the relative position of the holder and the point of action of the driving force varies, the point of action of the driving force in the focusing direction or the tracking direction deviates from the center of gravity of the holder, so that tilting of the holder may occur outside of the tilt correction.

Consequently, since the tilt angle at tilt correction varies according to the position of the holder, the control precision is degraded in controlling the tilt correction.

SUMMARY OF THE INVENTION

It is an object of the present invention to provide an objective lens driver capable of controlling tilt correction, that can correct tilts of low to high frequencies, that can perform stable tilt driving independent of the position of a movable member in the focusing direction or the tracking direction, and that does not degrade the control precision in the focusing direction and the tracking direction.

Other objects and advantages of the invention will become apparent from the detailed description that follows. The detailed description and specific embodiments described are provided only for illustration since various additions and modifications within the scope of the invention will be apparent to those of skill in the art from the detailed description.

According to an aspect of the present invention, there is provided an objective lens driver used for recording and/or reproduction of optical information on a disk type recording medium, and the objective lens driver comprises:

a movable member comprising:
an objective lens having, when being not driven, an optical axis in a focusing direction that is perpendicular to the disk type recording medium;
a lens holder holding the objective lens; and
at least one permanent magnet fixed onto the lens holder, having a direction of magnetization in a tangent direction that is perpendicular to the focusing direction and to a tracking direction parallel to the radius of the disk type recording medium;

a plurality of rod-shaped elastic supporting members, each supporting the movable member at an end thereof so that the movable member can move in the focusing direction and the tracking direction and rotate in a tilt direction that is a rotative direction around the tangent direction;

a fixed base to which the other ends of the rod-shaped elastic supporting members are connected;

means for driving the movable member in the focusing direction, the tracking direction, and the tilt direction by interaction with the permanent magnet, the driving means comprising:
at least two yokes comprising a magnetic material, disposed on the fixed base and facing the permanent magnet in the tangent direction;
at least one focusing coil winding round each yoke with its winding axis in the focusing direction;
at least one tracking coil winding round each yoke with its winding axis in the tracking direction; and
at least one tilt driving coil winding round each yoke with its winding axis in the focusing direction;

wherein the two yokes are arranged almost symmetrically about a plane including the center of gravity to the movable member in its not-driven state and being perpendicular to the tracking direction, and the tilt driving coils around the two yokes are arranged almost symmetrically about the plane.

In the objective lens driver so constructed, even when the movable member moves in the focusing direction or the tracking direction, since the permanent magnet (a magnetic field source) also moves with the movable member, the distribution of magnetic flux density between the permanent magnet and the yoke shifts by the same amount as the movement of the movable member. So, the density of magnetic flux orthogonally crossing the focusing coil, the tracking coil and the tilt driving coil becomes constant, and there is no variation in the driving sensitivity in the tilt correcting direction. As a result, stable tilt correction control is realized.

Further, since the distribution of magnetic flux density between the permanent magnet and the yoke shifts by the same amount as the movement of the movable member, the relative position of the movable member and the point of action of focusing drive, tracking drive or tilt drive does not vary. Therefore, the rotation center at tilt correction does not vary, so that the position of the objective lens in the focusing direction or the tracking direction does not vary. Consequently, control precision is not degraded in the focusing or tracking control.

Furthermore, since the distribution of magnetic flux density between the permanent magnet and the yoke shifts by the same amount as the movement of the movable member, the relative position of the movable member and the point of action of driving force in the focusing direction or the tracking direction does not vary. Therefore, tilting of the movable member does not occur outside of tilt correction, resulting in highly precise tilt correction control.

DETAILED DESCRIPTION OF THE PREFERRED EMBODIMENTS

Embodiment 1

An objective lens driver according to a first embodiment of the present invention will be described with reference to FIGS. 1 to 6.

Figure 1:
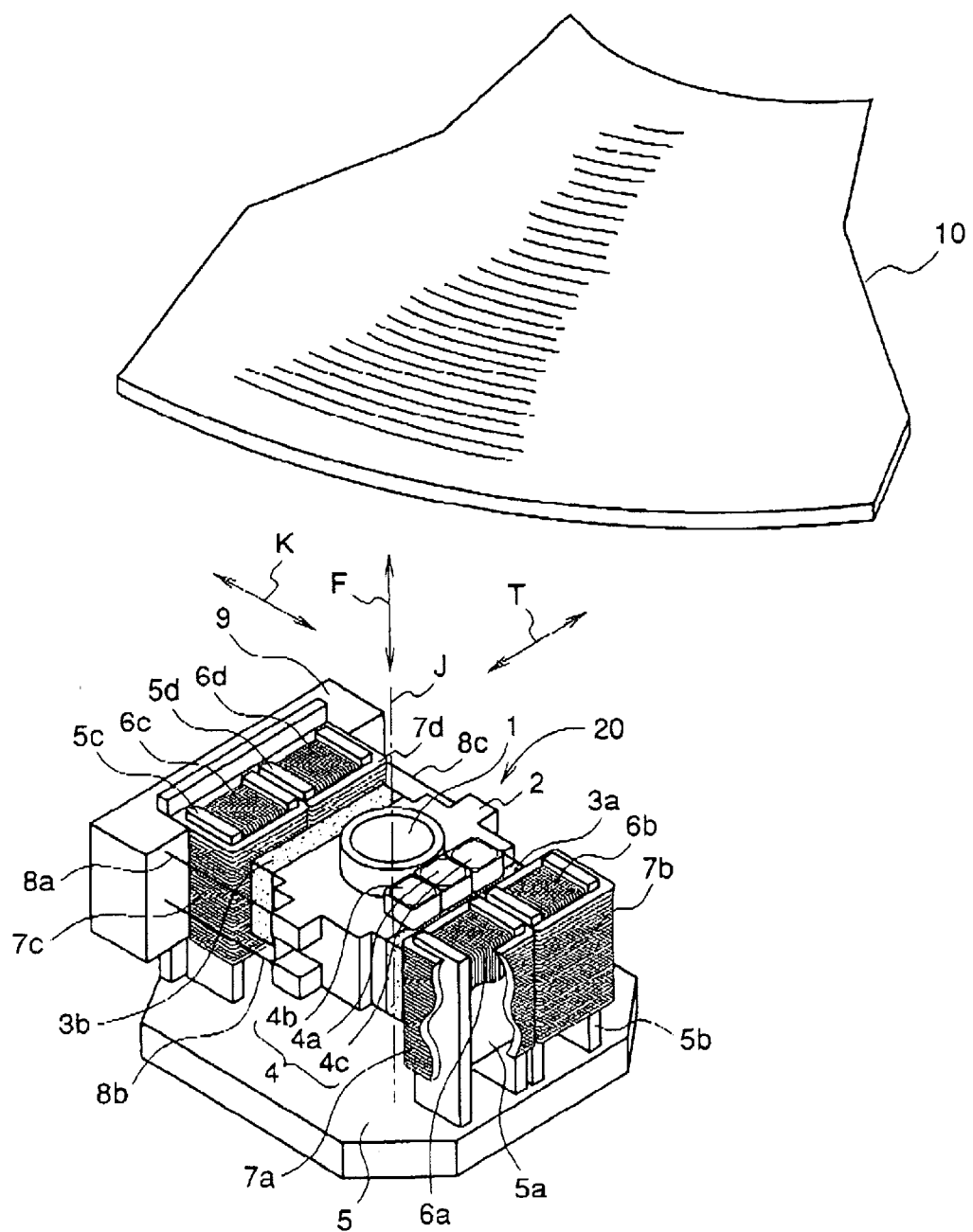
FIG. 1 is a perspective view illustrating an objective lens driver according to a first embodiment of the present invention.

FIG. 1 is a perspective view illustrating an objective lens driver according to the first embodiment. FIG. 1 shows the state where a movable member is not driven.

In FIG. 1, reference numeral 10 designates a disk, and reference characters T, F, and K designate the tracking direction parallel to the radius of the disk 10, the focusing direction perpendicular to the disk 10, and the tangent direction perpendicular to the focusing direction F and the tracking direction T, respectively. The focusing direction F, the tracking direction T, and the tangent direction K cross each other at right angles, and respectively correspond to directions of coordinate axes in a three-dimensional rectangular coordinate.

The objective lens driver comprises an objective lens 1; a lens holder 2 for holding the objective lens 1; permanent magnets 3a and 3b fixed on the lens holder 2 along the tangent direction K, each magnet being a rectangular plate extending in the focusing direction F and the tracking direction; a tilt detector 4 mounted on the lens holder 2; a fixed base 5; tracking coils 6a to 6d; focusing coils 7a to 7d; wire members (rod-shaped elastic supporting members) 8a to 8d (8d is not shown because it is located on the rear side of the lens holder 2); and a supporting member 9. The objective lens 1, the lens holder 2, the permanent magnets 3a and 3b, and the tilt detector 4 constitute a movable member 20. Further, reference character J shows the optical axis of the objective lens 1, which corresponds to the focusing direction F in the state where the movable member 20 is not driven. The shape of the lens holder 2 is almost symmetrical about its center in the focusing direction F, the tracking direction T, and the tangent direction K. The objective lens 1 is located in the center of the lend holder 2 in the focusing direction F, and the permanent magnets 3a to 3d are arranged symmetrically about the center of the lens holder 2 in the tangent direction, so that the center of gravity of the movable member 2 is approximately in the center of the lens holder 2. Accordingly, the optical axis J of the objective lens 2 passes almost the center of gravity of the movable member 20.

The tilt detector 4 comprises a light emitting part 4a, and light responsive parts 4b and 4c arranged in the tracking direction T with the light emitting part 4a between them. The light emitting part 4a emits light toward the disk 10. The light responsive parts 4b and 4c receive light reflected at the disk 10 and generate voltages in response to the quantities of the received light.

The fixed base 5 comprises a magnetic material. Yokes 5a to 5d are vertically disposed on the fixed base 5 along the tangent direction K, facing the permanent magnets 3a and 3b. More specifically, the yokes 5a and 5b are located facing the permanent magnet 3a while the yokes 5c and 8d are located facing the permanent magnet 3b. The yokes 5a and 5b are located almost symmetrically about a plane including the center of gravity of the movable member 20 and being perpendicular to the tracking direction T, and the yokes 5c and 5d are similarly located.

The tracking coils 6a to 6d, each having the winding axis in the tracking direction T, are wound round the yokes 5a to 5d, respectively. The focusing coils 7a to 7d, each having the winding axis in the focusing direction F, are wound round the yokes 5a to 5d, respectively.

The wire members 8a to 8d are rod-shaped elastic supporting members comprising a conductive material, having their axes in the tangent direction K, and being almost parallel to each other. An end of each wire member is connected to the lens holder 2, and the other end thereof is connected to the supporting member 9 that is vertically disposed on the fixed base 5, whereby the wire members 8a to 8a are fixed to the fixed base 5. Accordingly, by the wire members 8a to 8d, the movable member 20 is supported movably in the focusing direction F and the tracking direction T and rotatably in the rotative direction around the tangent direction K.

Furthermore, the centroid (center of figure) of a quadrilateral made by four points at which the four wire members 8a to 8d support the movable member 20, a middle point (driving center) of a segment connecting the centroids of pole faces of the permanent magnets 3a and 3b, and the center of gravity of the movable member 20 are in approximate agreement with each other.

Figure 2:
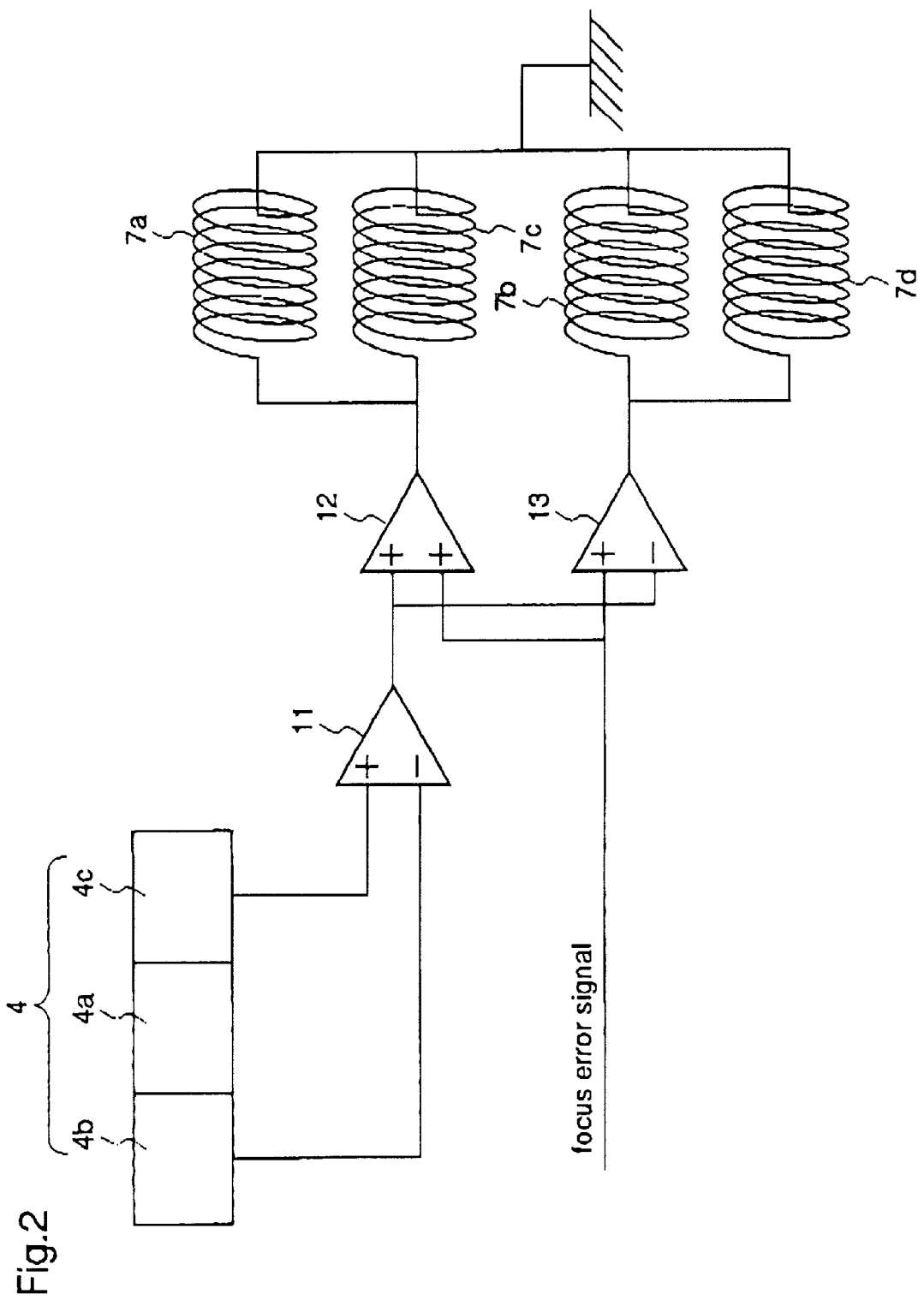
FIG. 2 is a block diagram illustrating a tilt control circuit employed for the objective lens driver according to the first embodiment.

FIG. 2 is a schematic diagram showing a tilt control circuit (tilt control means) employed for the objective lens driver according to the first embodiment. As shown in FIG. 2, the tilt control circuit comprises a differential amplifier 11 that outputs a difference in detected optical signals from the light responsive parts 4b and 4c of the tilt detector 4; a normal rotation driving amplifier 12 that outputs the sum of the differential output from the differential amplifier 11 and a focus error signal (focus driving signal); and a reverse rotation driving amplifier 13 that outputs a difference between the differential output from the differential amplifier 11 and the focus error signal. The output from the normal rotation driving amplifier 12 is applied to the focusing coils 7a and 7c while the output from the reverse rotation driving amplifier 13 is applied to the focusing coils 7b and 7d.

A description is now given of the operation of the objective lens driver so constructed. When driving the objective lens in the tracking direction T, the magnetic fluxes generated by the permanent magnets 3a and 3b orthogonally cross the currents flowing through the tracking coils 6a to 6d, whereby an electromagnetic force is generated. Since the tracking coils 6a to 6d are fixed onto the fixed base 5, the movable member 20 moves almost translationally in the tracking direction T. On the other hand, when driving the objective lens in the focusing direction F, the magnetic fluxes generated by the permanent magnets 3a and 3b orthogonally cross the currents flowing through the focusing coils 7a to 7d, whereby an electromagnetic force is generated and the movable member 20 moves almost translationally in the focusing direction F.

Figure 3:
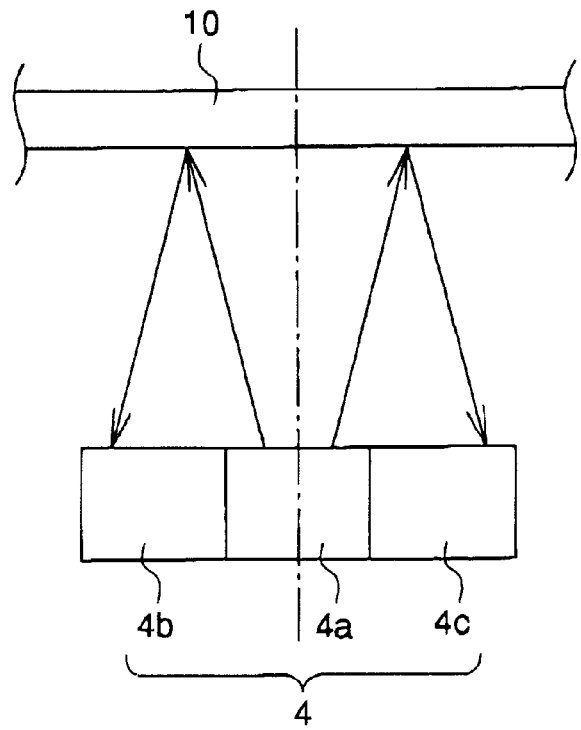
FIG. 3 is a schematic diagram illustrating a tilt detecting means included in the objective lens driver according to the first embodiment, in the case where no tilt occurs.
Figure 4:
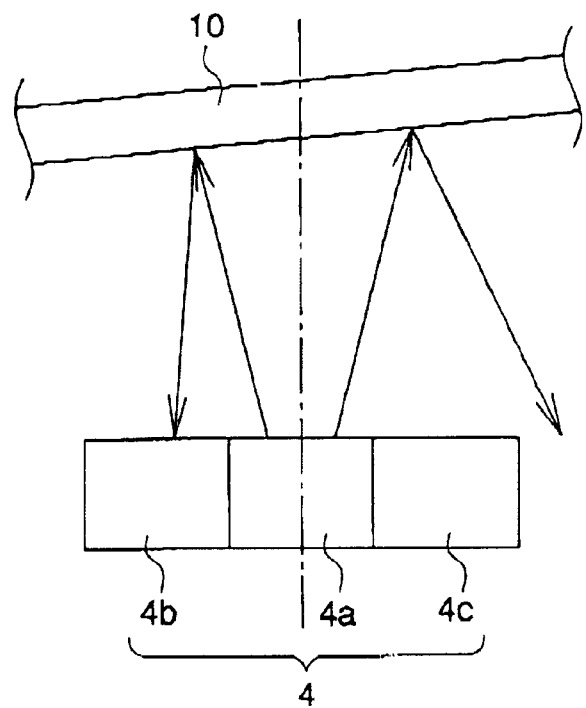
FIG. 4 is a schematic diagram illustrating the tilt detecting means in the case where tilt occurs.

Next, a description is given of rotation drive around the tangent direction K. First of all, tilt detection is carried out as follows. When the optical axis J of the objective lens 1 is perpendicular to the disk 10 as shown in FIG. 3, light emitted from the light emitting part 4a of the tilt detector 4 is reflected at the disk 10 and received by the light responsive parts 4b and 4c. The quantity of light received by the light responsive part 4b is equal to the quantity of light received by the light responsive part 4c. On the other hand, when the optical axis J of the objective lens 1 is not perpendicular to the disk 10 as shown in FIG. 4, a portion of light reflected by the disk 10 is not received by the light responsive part 4b or 4c, so that a difference arises between the quantity of light received by the light responsive part 4b and the quantity of light received by the light responsive part 4c. Accordingly, a tilt can be detected by detecting this difference. In this first embodiment, signals generated in the light responsive parts 4b and 4c are Input to the differential amplifier 11, and a difference between these signals is detected to generate a tilt error signal (tilt driving signal).

Tilt drive, i.e., rotation drive around the tangent direction K, is performed as follows. First of all, the tilt error signal is divided into two, and one is input to the normal rotation driving amplifier 12 while the other is input to the reverse rotation driving amplifier 13. The output from the normal rotation driving amplifier 12 and the focus error signal are applied to the focusing coils 7a and 7c, and the output from the reverse rotation driving amplifier 13 and the focus error signal are applied to the focusing coils 7b and 7d. Accordingly, a moment according to the tilt error signal acts on the permanent magnets 3a and 3b, whereby the angle error between the disk 10 and the optical axis J of the objective lens 1 is corrected.

Further, tilt drive when the movable member 20 moves in the tracking direction T will be described with reference to FIGS. 5 and 6. It is assumed that a tilt driving current according to the angle error between the disk 10 and the optical axis J of the objective lens 1, i.e., the tilt error signal, is applied through the normal rotation driving amplifier 12 and the reverse rotation driving amplifier 13 to the focusing coils 7a and 7c and the focusing coils 7b and 7d, respectively. When the movable member 20 is located in the neutral position shown by the solid line in FIG. 5, i.e., when it is not driven, reaction forces of electromagnetic forces generated by the focusing coils 7a to 7d are generated in the permanent magnets 3a and 3b. Among these forces, the tilt driving force in the tracking direction T is distributed as shown by the solid line in FIG. 6. Assuming that an axis passing the center of gravity of the movable member 20 and being parallel to the tangent direction K is called "a center-of-gravity axis", the distribution of the tilt driving force is almost symmetrical about the center-of-gravity axis of the movable member 20, and the movable member 20 rotates on the center-of-gravity axis by an angle according to the tilt error signal.

Figure 5:
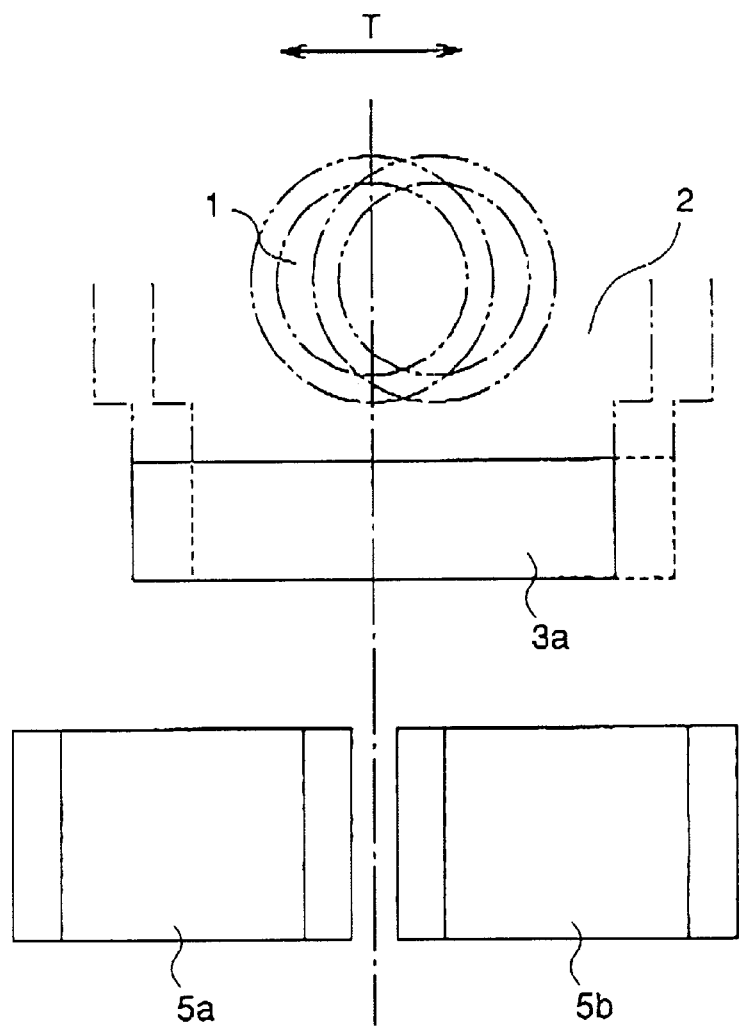
FIG. 5 is a schematic diagram for explaining the operation of the objective lens driver according to the first embodiment.
Figure 6:
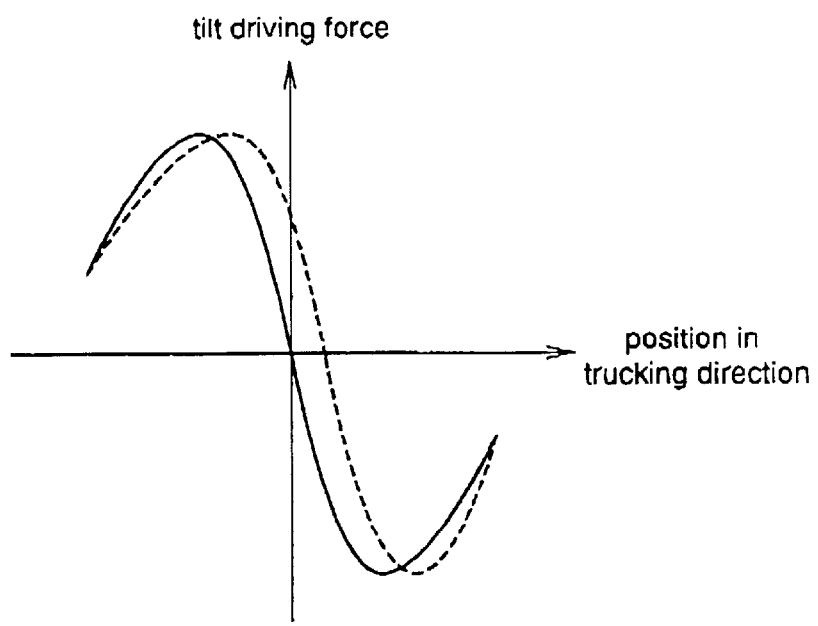
FIG. 6 is a graph showing distribution of tilt driving force in the tracking direction, applied to a movable member in the objective lens driver according to the first embodiment.

When the movable member 20 has moved in the tracking direction T and is located in the position shown by the dotted line in FIG. 5, since the permanent magnets 3a and 3b serving as magnetic field sources have moved with the movable member 20, the magnetic flux density distribution between the permanent magnet 3a and the yokes 5a and 5b or between the permanent magnet 3b and the yokes 5c and 5d changes as well, so that the tilt driving force in the tracking direction T is distributed as shown by the dotted line in FIG. 6. That is, since the distribution of the tilt driving force moves with the move of the permanent magnets 3a and 3b, this distribution is almost symmetrical about the center-of-gravity axis of the movable member 20. Accordingly, the movable member 20 rotates on the center-of-gravity axis by an angle according to the tilt error signal. Consequently, constant sensitivity to tilt drive is obtained regardless of the position of the movable member 20.

In this first embodiment, the focusing coils 7a and 7b (7c and 7d) are located almost symmetrically about a plane including the center of gravity of the movable member 20 and being perpendicular to the tracking direction T, thereby to supply the movable member 20 with a rotation driving force round the center-of-gravity axis thereof. However, the present invention is not restricted thereto. For example, two tracking coils may be located almost symmetrically about a plane including the center of gravity of the movable member 20 and being perpendicular to the focusing direction F, and a signal obtained by superposing the tilt error signal on the tracking error signal may be output toward the tracking coils.

Although in this first embodiment the direction of gravity is not specifically discussed, the same effects as mentioned above are obtained regardless of the direction of gravity. Further, although an emphasis has been placed on the sensitivity to tilt drive in the case where the movable member 20 moves in the tracking direction T, the same effects as mentioned above are obtained also in the case where the movable member 20 moves in the focusing direction F. Furthermore, the shape of cross section of the wire members 8a–8d serving as rod-shaped elastic supporting members may be any of circle, polygon, and ellipse.

Although in this first embodiment four rod-shaped elastic supporting members (wire members 8a to 8d) are employed as a mechanism for supporting the movable member 20, any supporting mechanism may be employed as long as it can support the movable member 20 movably in the three axes, i.e., the focusing direction F, the tracking direction T, and the tilt driving direction that is the rotative direction around the tangent direction K. For example, a supporting mechanism may be fabricated by shaping parallel flat springs by etching or the like so that it supports the movable member 20 movably in the three axes. Also in this case, the same effects as mentioned above are obtained.

Although in this first embodiment a reflection type optical sensor mounted on a movable member (tilt detector 4) is employed as a tilt detecting means, the tilt detecting means is not restricted thereto, and any means may be employed as long as it can detect the relative angle of the disk 1 and the optical axis J of the objective lens 1. Further, in place of the light emitting part 4a of the tilt detector 4, a portion of light beam for recording/reproduction may be used. In this case, reduction in weight and simplification in structure are achieved in addition to the same effects as mentioned above.

Furthermore, although in this first embodiment tilt drive is implemented by applying superposed focus error signal and tilt error signal to the focusing coils, tilt drive may be implemented by using tilt driving coils and applying the tilt error signal to the tilt driving coils.

Embodiment 2

Figure 7:
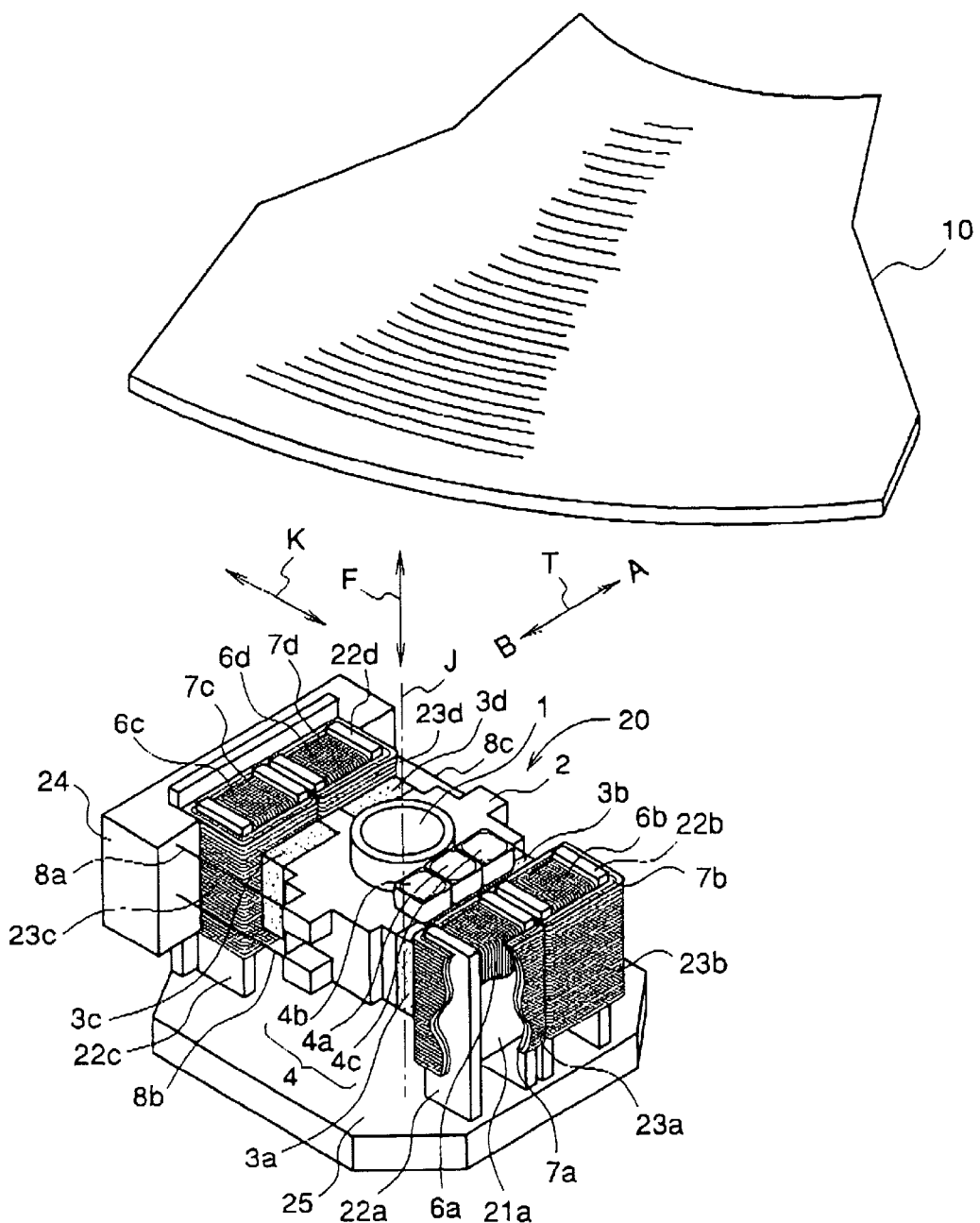
FIG. 7 is a perspective view illustrating an objective lens driver according to a second embodiment of the present invention.

Hereinafter, an objective lens driver according to a second embodiment of the invention will be described with reference to FIGS. 7 to 12. FIG. 7 is a perspective view illustrating an objective lens driver according to the second embodiment. The objective lens driver according to this second embodiment is different from the objective lens driver according to the first embodiment in the following respect. In the first embodiment shown in FIG. 1, two permanent magnets 3a and 3b are disposed on opposed sides of the lens holder 2 at both sides of the objective lens 1 in the tangent direction K. In this second embodiment, however, as shown in FIG. 7, four permanent magnets 3a to 3d are disposed, two by two, on the opposed sides of the lens holder 2. More specifically, two permanent magnets 3a and 3b and two permanent magnets 3c and 3d are disposed on the opposed sides of the lens holder 2, respectively, along the tracking direction T, and the permanent magnets on the same side are symmetrical about a plane including the optical axis J of the objective lens 1 and being perpendicular to the tracking direction T. Further, these four permanent magnets 3a to 3d face four yokes 21a to 21d, respectively, in one to one correspondence.

Furthermore, tilt driving coils 23a to 23d, each having the winding axis in the focusing direction F, are wound round the focusing coils 7a to 7d of the yokes 21a to 21d, respectively.

The structure of the objective lens driver will be described in more detail.

The objective lens driver comprises an objective lens 1; a lens holder 2 for holding the objective lens 1; permanent magnets 3a to 3d fixed, two by two, onto opposed sides of the lens holder so that the two magnets on the same side are symmetrical with a plane including the optical axis J of the objective lens 1 and being perpendicular to the tracking direction T; a tilt detector 4 mounted on the lens holder 2; yokes 21a to 21d facing the permanent magnets 3a to 3d, respectively, and comprising a magnetic material; bobbins 22a to 22d formed by resin-molding the yokes 21a to 21d, respectively; a fixed base 25 on which the bobbins 22a to 22d are fixed; tracking coils 6a to 6d; focusing coils 7a to 7d; tilt driving coils 23a to 23d; wire members 8a to 8d; and a supporting member 9. The objective lens 1, the lens holder 2, the permanent magnets 3a to 3d, and the tilt detector 4 constitute a movable member 20.

The tilt detector 4 comprises a light emitting part 4a, and light responsive parts 4b and 4c arranged in the tracking direction T with the light emitting part 4a between them. The light emitting part 4a emits light toward the disk 10. The light responsive parts 4b and 4c receive light reflected at the disk 10 and generate voltages in response to the quantities of the received light.

The yokes 21a to 21d are disposed along the tangent direction K, facing the permanent magnets 3a to 3d, respectively. To be specific, the yoke 21a is located facing the permanent magnet 3a, the yoke 21b is located facing the permanent magnet 3b, the yoke 21c is located facing the permanent magnet 3c, and the yoke 21d is located facing the permanent magnet 3d. The yokes 21a and 21b are located almost symmetrically about a plane including the center of gravity of the movable member 20 and being perpendicular to the tracking direction T, and the yokes 21c and 21d are similarly located.

The tracking coils 6a to 6d, each having the winding axis in the tracking direction T, are wound round the bobbins 22a to 22d, respectively. The focusing coils 7a to 7d, each having the winding axis in the focusing direction F, are wound round the bobbins 22a to 22d, respectively. The tilt driving coils 23a to 23d, each having the winding axis in the focusing direction F, are wound round the bobbins 22a to 22d, respectively.

The wire members 8a to 8d are rod-shaped elastic supporting members comprising a conductive material, having their axes in the tangent direction K, and being almost parallel to each other.

An end of each wire member is connected to the lens holder 2, and the other end thereof is connected to the supporting member 9, whereby the wire members 8a to 8a are fixed to the fixed base 5. Accordingly, by the wire members 8a to 8d, the movable member 20 is supported movably in the focusing direction F, the tracking direction T, and the rotative direction around the tangent direction K.

Furthermore, the centroid (center of figure) of a quadrilateral made by four points at which the four wire members 8a to 8d support the movable member 20 (supporting center, shown by 120 in FIGS. 9(a), 9(b)); a middle point of a segment that connects middle points of two segments, i.e., a segment connecting the centroids (shown by 121 in FIGS. 9(a), 9(b)) of pole faces of the magnets 3a and 3b and a segment connecting the centroids (121) of pole faces of the magnets 3c and 3d (driving center, shown by 122 in FIGS. 9(a), 9(b)); and the center of gravity of the movable member 20 (shown by 101 in FIGS. 9(a), 9(b)) are in approximate agreement with each other.

Figure 8:
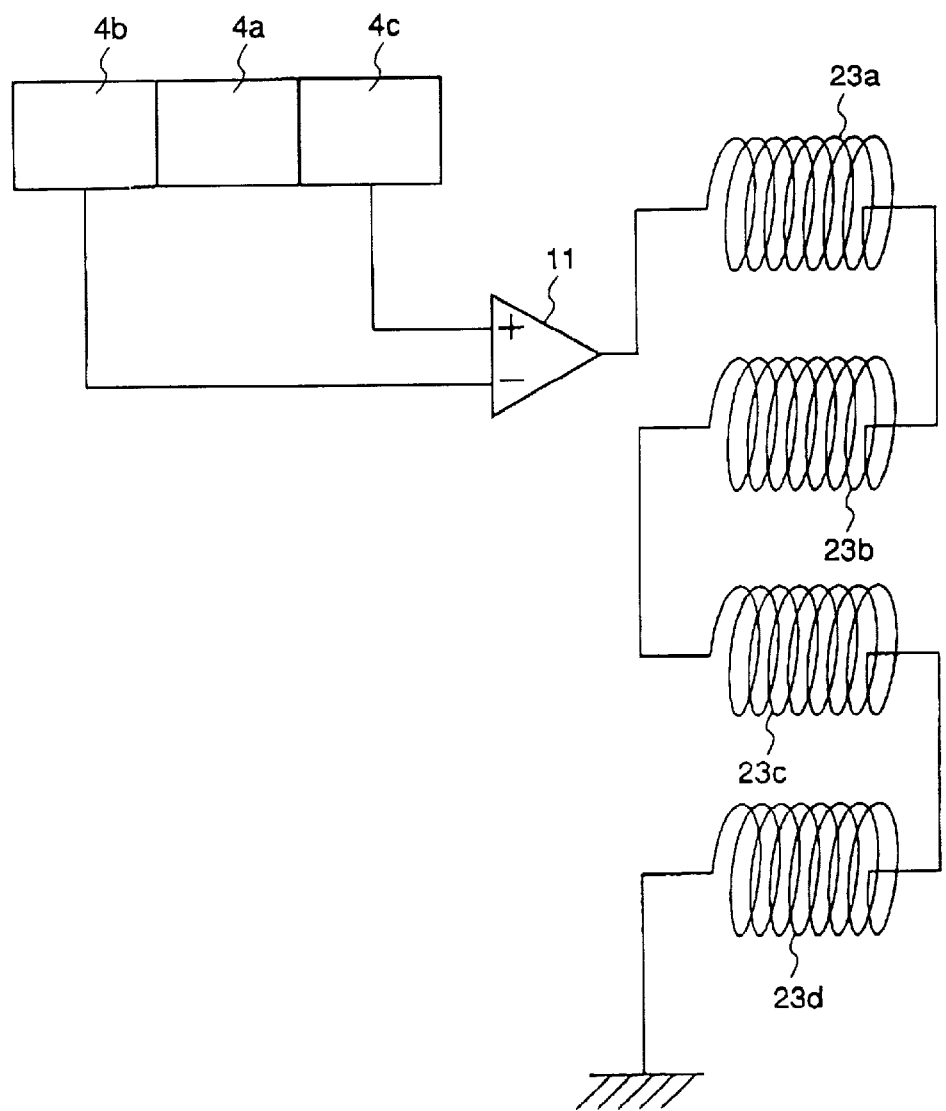
FIG. 8 is a block diagram illustrating a tilt correction control circuit employed for the objective lens driver according to the second embodiment.

FIG. 8 is a schematic diagram showing a tilt control circuit (tilt control means) employed for the objective lens driver according to the second embodiment. In the tilt control circuit, a difference of detected optical signals from the light responsive parts 4b and 4c of the tilt detector 4 is amplified by a differential amplifier 11, and an output from the amplifier 11 is applied to the tilt driving coils 23a to 23d which are connected in series.

A description is now given of the operation of the objective lens driver so constructed. When driving the objective lens in the tracking direction T, the magnetic fluxes generated by the permanent magnets 3a and 3b orthogonally cross the currents flowing through the tracking coils 6a to 6d, whereby an electromagnetic force is generated. Since the tracking coils 6a to 6d are fixed onto the fixed base 25, the movable member 20 moves almost translationally in the tracking direction T. On the other hand, when driving the objective lens in the focusing direction F, the magnetic fluxes generated by the permanent magnets 3a and 3b orthogonally cross the currents flowing through the focusing coils 7a to 7d, whereby an electromagnetic force is generated and the movable member 20 moves almost translationally in the focusing direction F.

Figure 9:
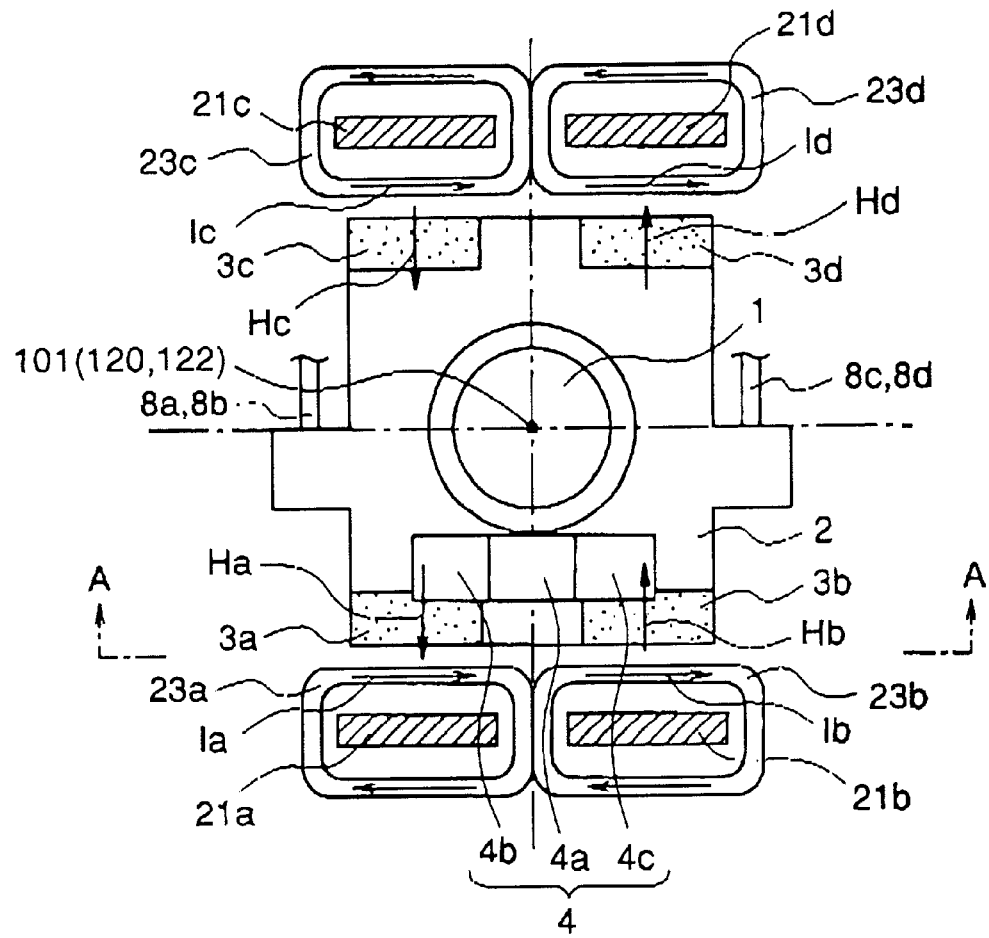
FIG. 9(a) is a schematic diagram for explaining the operation of the objective lens driver according to the second embodiment.
FIG. 9(b) is a cross-sectional view taken along a ling A—A in FIG. 9(a).
Figure 9:
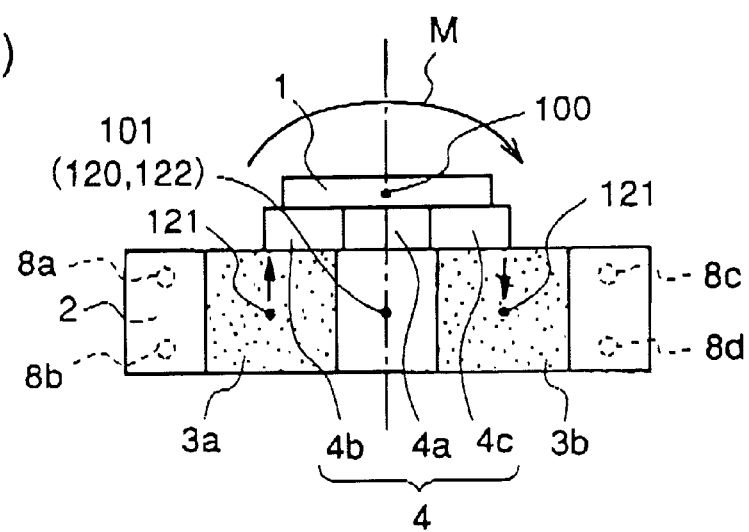

Next, rotation drive around the tangent direction K will be described using FIGS. 8 and 9. With reference to FIG. 8, when a tilt error signal produced by the differential amplifier 11 is input to the tilt driving coils 23a to 23d which are connected in series, currents flow through the tilt driving coils 23a to 23d in the directions Ia to Id shown in FIG. 9(a), respectively. Therefore, reaction forces generated in the tilt driving coils 23a to 23d are applied to the permanent magnets 3a and 3b, whereby an angular moment in the direction M is generated in the movable member 20 as shown in FIG. 9(b).

As described above, since the relative angle of the disk 10 and the movable member 20 is detected by the tilt detector 4 and a tilt error signal corresponding to the amount of tilt is applied to the tilt driving coils 23a to 23d, a tilt of the disk 10 relative to the optical axis J of the objective lens 1 is corrected.

Furthermore, a description is given of tilt drive in the case where the movable member 20 moves in the tracking direction T.

Figure 10:
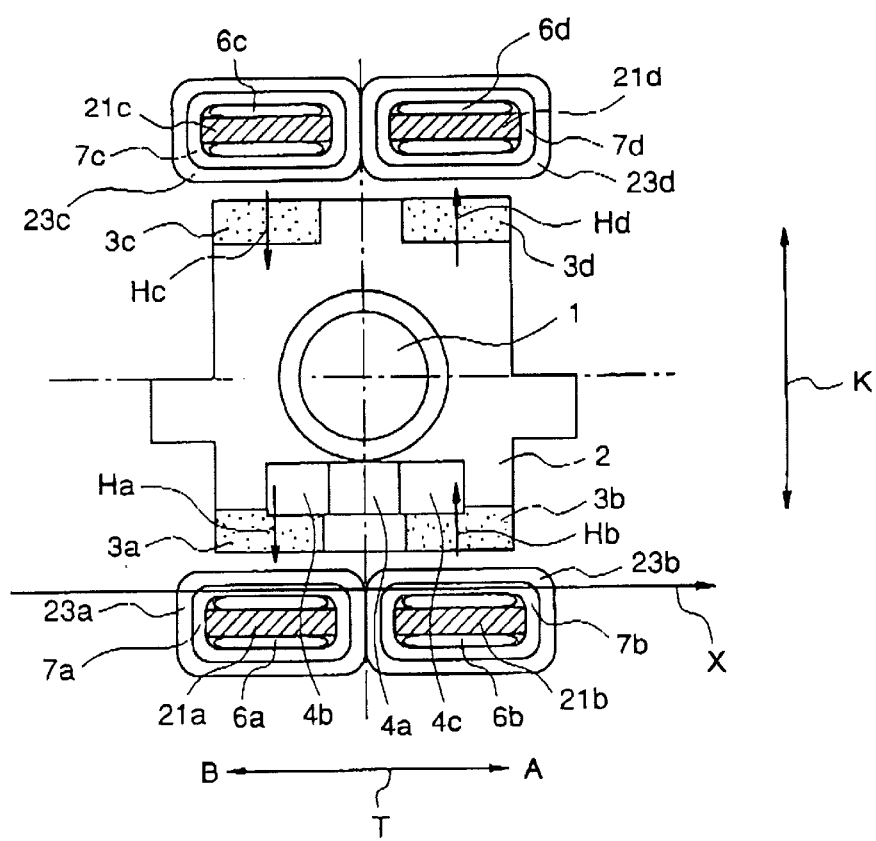
FIG. 10 is a schematic diagram of the objective lens driver according to the second embodiment, in the state where the movable member is in the neutral position.
Figure 11:
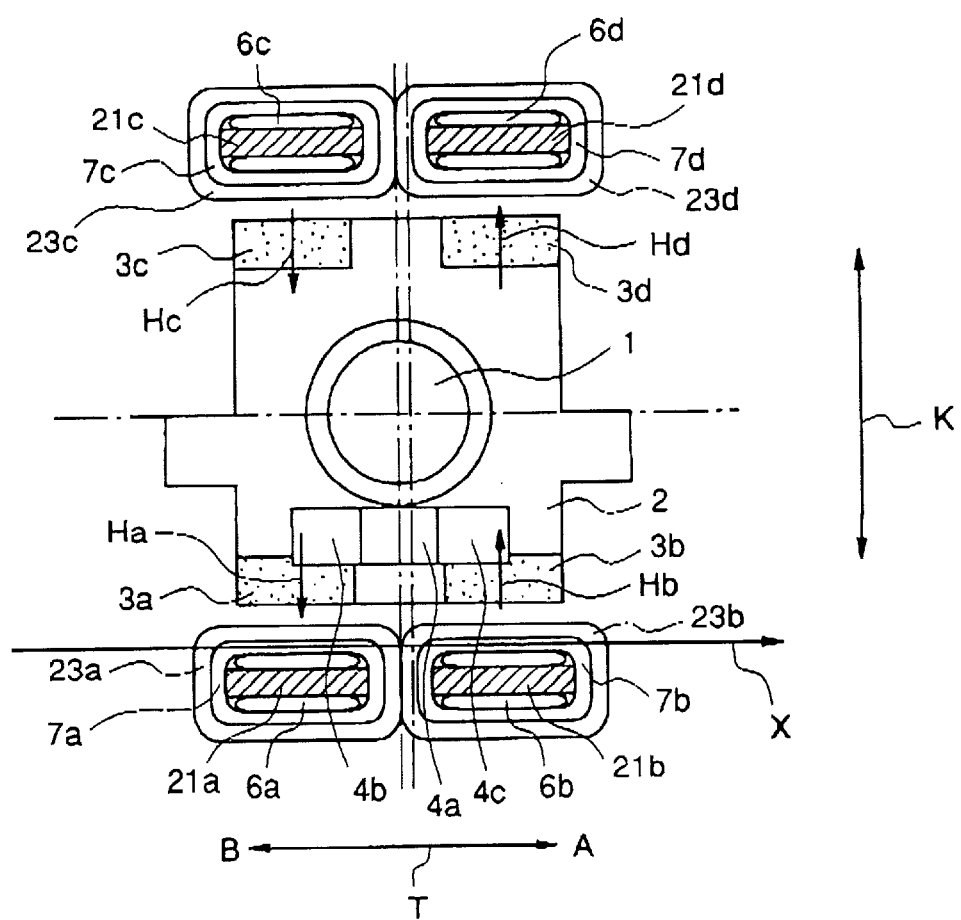
FIG. 11 is a schematic diagram of the objective lens driver according to the second embodiment, in the state where the movable member has moved in the tracking direction from the neutral position.
Figure 12:
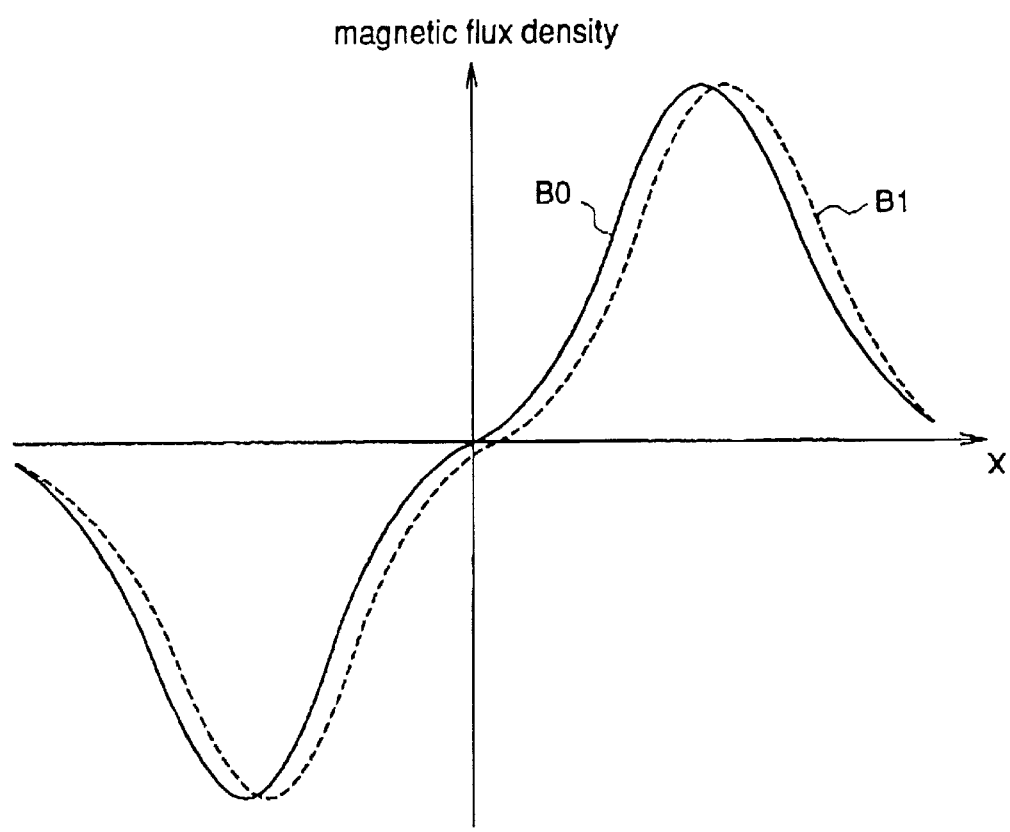
FIG. 12 is a graph showing distribution of magnetic flux density in the tracking direction, for explaining the operation of the objective lens driver according to the second embodiment.

With reference to FIG. 12, the x axis shows the position of the movable member 20 in the tracking direction T shown in FIGS. 10 and 11, B0 shows the magnetic flux density distribution of a component in the direction K on the x axis when the relative position of the movable member 20 and the yokes 21a and 21b is as shown in FIG. 10, and B1 shows the magnetic flux density distribution of the component in the direction K on the x axis when the relative position of the movable member 20 and the yokes 21a and 21b is as shown in FIG. 11.

When the movable member 20 is located in the neutral position as shown in FIG. 10, the center line of the permanent magnet 3a (3b) and the center line of the yoke 21a (21b), which center lines are perpendicular to the tracking direction T, are aligned each other, so that the magnetic flux density distribution is symmetrical as shown by B0 in FIG. 12. When the movable member 20 moves toward A in the tracking direction T as shown in FIG. 11, as the permanent magnets 3a and 3b move, the magnetic flux density distribution changes as shown by B1 in FIG. 12, i.e., it shifts toward A in the tracking direction T, resulting in asymmetric distribution. At this time, since the shift of distribution is equal to the movement of the movable member 20, the points of action of focusing drive force and tracking drive force act approximately on the center of gravity. Accordingly, with respect to focusing drive and tracking drive, it is possible to drive the center of gravity regardless of the position of the movable member 20. Similarly, with respect to tilt drive, since the moment acting on the permanent magnet 3a is always equal to the moment acting on the permanent magnet 3b regardless of the position of the movable member, drive in the rotative direction is always carried out with the same axis as the center of rotation.

As described above, in this second embodiment of the invention, the yokes 21a and 21b, the tilt driving coils 23a and 23b, and the permanent magnets 3a and 3b are located almost symmetrically about a plane including the center of gravity of the movable member 20 and being perpendicular to the tracking direction T. Further, the yokes 21c and 21d, the tilt driving coils 23c and 23d, and the permanent magnets 3c and 3d are similarly located. Therefore, when the permanent magnets 3a to 3d move with the movable member 20, the magnetic flux density distribution shifts by the same amount as the movement of the movable member 20, so that center-of-gravity drive is possible with respect to focusing drive and tracking drive regardless of the position of the movable member 20.

Accordingly, in addition to the effect that unnecessary resonance does not occur during focusing drive and tracking drive, since unwanted angular moment is not applied to the movable member 20, no tilting occurs due to move of the movable member 20 in the focusing direction F and the tracking direction T. Therefore, highly precise focusing control, tracking control, and tilt correction control are realized.

Further, since the moments applied to the permanent magnets 3a and 3b are always equal regardless of the position of the movable member 20, drive in the rotative direction is always carried out with the same axis as the center of rotation, so that crosstalk in the focusing direction F and the tracking direction T due to drive in the rotative direction is minimized. Thereby, disturbance to focusing control and tracking control due to tilt correction control is suppressed, resulting in stable control.

Although in this second embodiment a reflection type optical sensor mounted on a movable member (tilt detector 4) is employed as a tilt detecting means, any means may be employed as long as it can detect the relative angle of the disk 1 and the optical axis J of the objective lens 1. When a portion of light beam for recording/production is used in place of the light emitting part 4a of the tilt detector 4, reduction in weight and simplification in structure are achieved in addition to the same effects as mentioned above.

Although in this second embodiment the objective lens driver include two pairs of symmetrically arranged yokes, permanent magnets and tilt driving coils, the number of these pairs is not restricted to two, that is, it may be one or more than two.

Although in this second embodiment the direction of gravity is not specifically discussed, the same effects as mentioned above are obtained regardless of the direction of gravity.

Further, the shape of cross section of the wire members 8a–8d serving as rod-shaped elastic supporting members may be any of circle, polygon, and ellipse.

Furthermore, in this second embodiment, four rod-shaped elastic supporting members (wire members 8a to 8d) are employed as a mechanism for supporting the movable member 20. However, other supporting mechanism using parallel flat springs or resin hinges may be employed with the same effects as mentioned above.

Although in this second embodiment tilt drive is performed by using the tilt driving coils and applying a tilt error signal to the tilt driving coils, tilt drive can be performed by using the focusing coils as tilt driving coils and applying superposed focus error signal and tilt error signal to the focusing coils serving as tilt driving coils.

Embodiment 3

Figure 13:
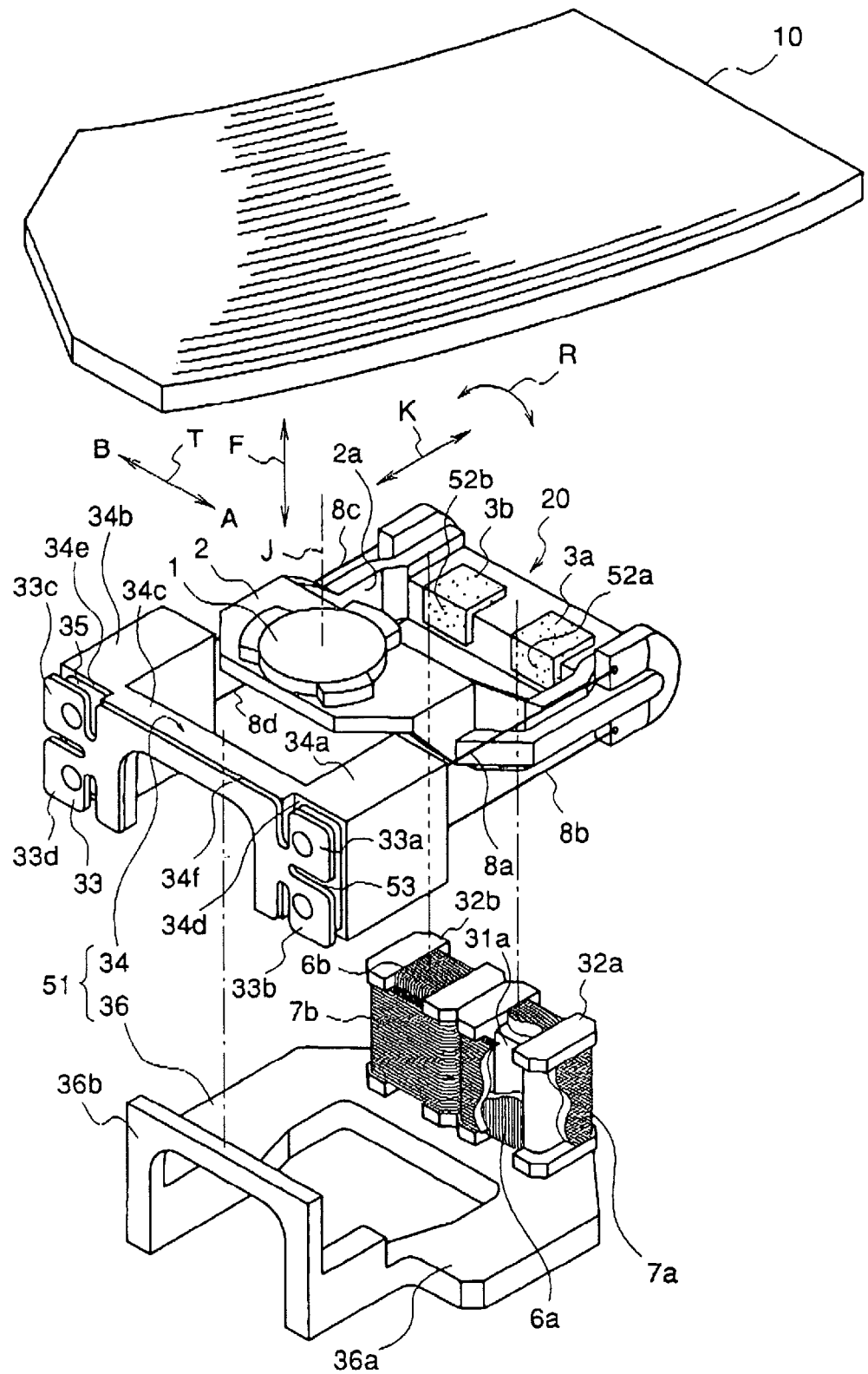
FIG. 13 is an exploded perspective diagram illustrating an objective lens driver according to a third embodiment of the invention.
Figure 14:
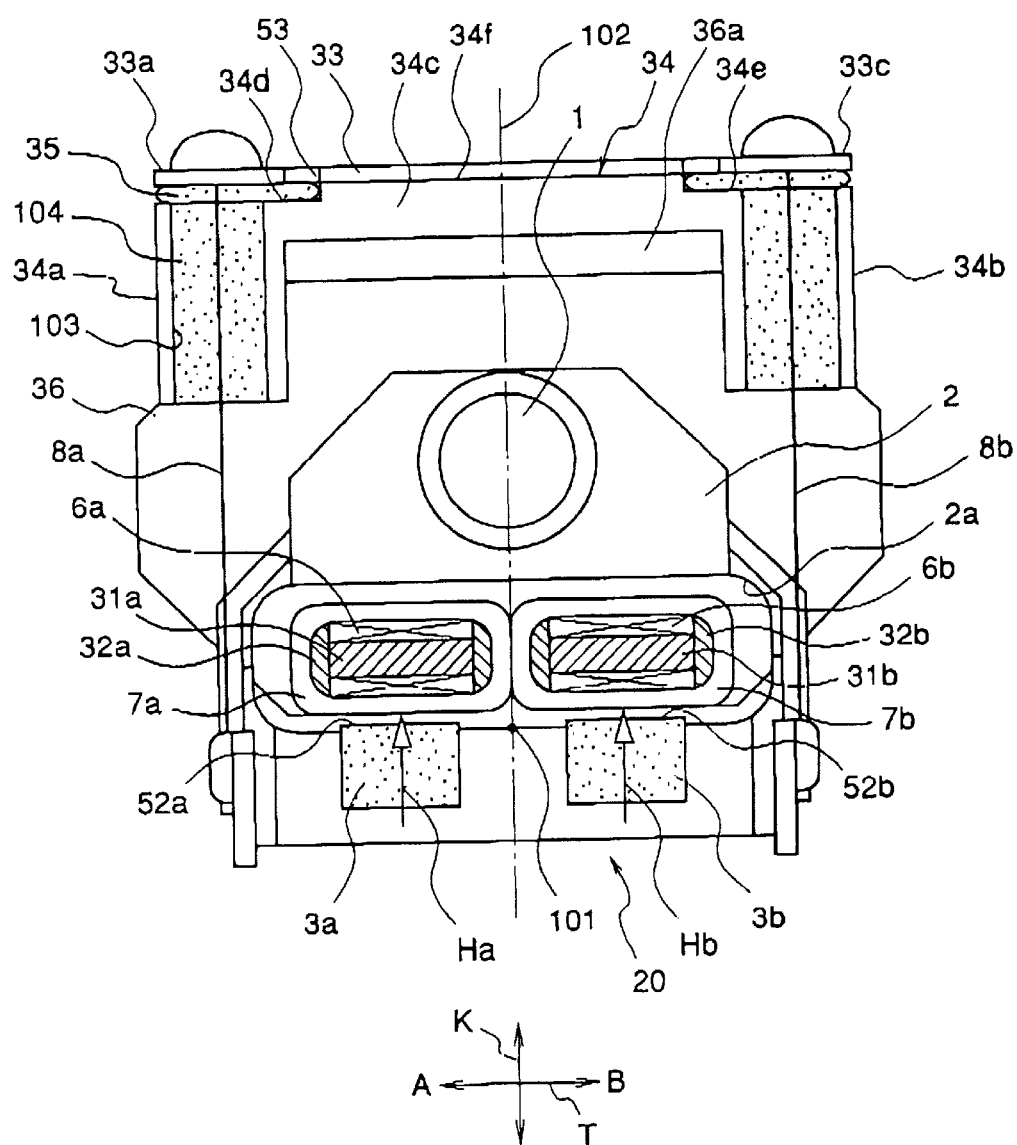
FIG. 14 is a plan view schematically illustrating the objective lens driver according to the third embodiment.

An objective lens driver according to a third embodiment of the invention will be described with reference to FIGS. 13 to 16. FIG. 13 is an exploded perspective view illustrating an objective lens driver according to the third embodiment. FIG. 14 is a plan view schematically showing the objective lens driver shown in FIG. 13. Both of FIGS. 13 and 14 show the state where a movable member is not driven. In FIG. 14, bobbins 32a and 32b are shown in transverse cross sections, and a holding member 34 is shown perspectively.

In these figures, reference numeral 10 designates a disk, and reference characters F, T, K, and R designate the focusing direction, the tracking direction, the tangent direction, and the tilt direction, respectively. The focusing direction F, the tracking direction T, and the tangent direction K cross each other at right angles, and respectively correspond to directions of coordinate axes in a three-dimensional rectangular coordinate.

Reference numeral 2 designates a lens holder comprising a molded resin. The lens holder 2 has, in its center, a rectangle window 2a having longitudinal sides in the tracking direction T. On one side of the window 2a in the tangent direction K, an objective lens 1 is disposed having its optical axis J in the focusing direction F. On the other side of the window 2a, a first permanent magnet 3a and a second permanent magnet 3b are disposed in the tracking direction T, along the peripheral surface of the window 2a. Each of the first and second permanent magnets 3a and 3b is a rectangular parallelopiped in shape, and these magnets are embedded in the lens holder 2. The objective lens 1 and the first and second permanent magnets 3a and 3b are disposed symmetrically about a symmetry plane 102 passing the center of gravity 101 of the lens holder 2 and being parallel to the focusing direction F and the tangent direction K. Further, the first and second permanent magnets 3a and 3b are disposed so that their pole faces 52a and 52b are perpendicular to the tangent direction K and the directions of magnetization Ha and Hb are in the same direction. The objective lens 1, the lens holder 2, and the first and second permanent magnets 3a and 3b constitute a movable member 20. The driving center of the first and second permanent magnets 3a and 3b for driving the movable member 20 is in approximate agreement with the center of gravity 101 of the movable member 20.

Reference numeral 34 designates a holding member comprising a transparent resin. The holding member 34 comprises two viscoelastic material housing parts 34a and 34b extending in the tangent direction K, and a connecting part 34c that connects the viscoelastic material housing parts 34a and 34b. The connecting part 34c extends in the tracking direction T, and it is shaped like inverted U in the focusing direction F. Further, the holding member 34 has an end face 34f and two step-like concavities 34d and 34e at opposite sides of the end face 34f. The width of each concavity is uniform over the entire length of the holding member 34 in the focusing direction F.

Each of the viscoelastic material housing parts 34a and 34b has two cylindrical viscoelastic material housing holes 103 penetrating the housing part in the tangent direction K, and the center-to-center pitch of these holes is the same as the pitch of the wire members 8a and 8b (8c and 8d). Further, on the end face 34f of the holding member 34, a supporting plate 33 comprising an elastic metal such as phosphor bronze is fixed, covering the end face 34f and the step-like concavities 34d and 34e. The supporting plate 33 has four slits 53 in the focusing direction F opposite the steps of the concavities 34d and 34e, and two slits 53 in the tracking direction T opposite the center of the concavities 34d and 34e in the focusing direction F. By these slits, the supporting plate 33 covering the concavities 34d and 34e is divided into four movable portions 33a to 33d corresponding to the four viscoelastic material housing holes 103 of the viscoelastic material housing parts 34a and 34b, respectively. These four movable portions 33a to 33d are capable of elastic displacement, independently, in the tangent direction K.

Between the movable portions 33a to 33d of the supporting plate 33 and the side portions of the lens holder 2, four wire members (rod-shaped elastic supporting members) 8a to 8d, which are elastically deformable in the transverse cross-sectional direction, are stretched in the tangent direction K parallel to each other. To be specific, each wire member penetrates through each viscoelastic material housing hole 103 of the holding member 34, and an end of each wire member is soldered to one of the movable parts 33a to 33d of the supporting plate 33 while the other end thereof is soldered to the side portion of the lens holder 2. These four wire members 8a to 8d are stretched so that the supporting center for supporting the movable member 20 is in approximate agreement with the center of gravity 101 of the movable part 20. Employed as the wire members 8a to 8d are wires or rods comprising an elastic metal material such as phosphor bronze, and having circular, polygonal, or oval cross sections.

The viscoelastic material housing holes 103 are filled with a viscoelastic material 104 so that the wire members 8a, 8b, 8c, and 8d are surrounded by the viscoelastic material. In the step-like concavity 34d (34e), a viscoelastic material 35 (damping member) is disposed, surrounding the wire members 8a and 8b (8c and 8d) and contacting the movable portions 33a and 33b (33c and 33d) of the supporting plate 33.

Reference numeral 36 designates a fixed metal base. This base 36 comprises a body 36a made of a U-shaped metal plate extending in the tracking direction T and the tangent direction K, and a junction part 36b protruding from edges of the body 36a in the tangent direction K. The junction part 36b is shaped so that its external surface can be engaged with the internal surface of the holding member 34 comprising the viscoelastic material housing parts 34a and 34b and the connecting part 34c. Since the holding member 34 is formed by insert molding using the fixed base 36 and the supporting plate 33, the holding member 34 can be fixed onto the fixed base 36 so that the external surface of the junction part 36b of the fixed base 36 abuts the internal surface of the holding member 34. The fixed base 36 and the holding member 34 constitute a base 51. Accordingly, the movable memory 20 is supported by the four wire members 8a to 8d so that it is elastically movable in the focusing direction F and the tracking direction T relative to the base 51 and rotatable in the tilt direction R with the center of gravity 101 of the movable member 20 as the center of rotation. Further, the four wire members 8a to 8d are supported by the supporting plate 33 so that they are capable of producing displacement, independently, along their longitudinal directions with respect to the base 51.

Furthermore, a first bobbin 32a and a second bobbin 32b are vertically disposed on the body 36a of the fixed base 36 so that they are located in the window 2a of the lens holder 2, side by side in the tracking direction T.

The first and second bobbins 32a and 32b are formed by resin molding of yokes 31a and 31b respectively facing the first and second permanent magnets, each yoke comprising a magnetic plate extending in the focusing direction F and the tracking direction T. Tracking coils 6a and 6b are wound round the yokes 31a and 31b, respectively, having the winding axis in the tracking direction T, and focusing coils 7a and 7b are wound round the tracking coils 6a and 6b, respectively, having the winding axis in the focusing direction F. The first bobbin 32a and the second bobbin 32b are disposed symmetrically about the symmetry plane 102 of the lens holder 2 in the state where the movable member 20 is not driven.

Figure 15:
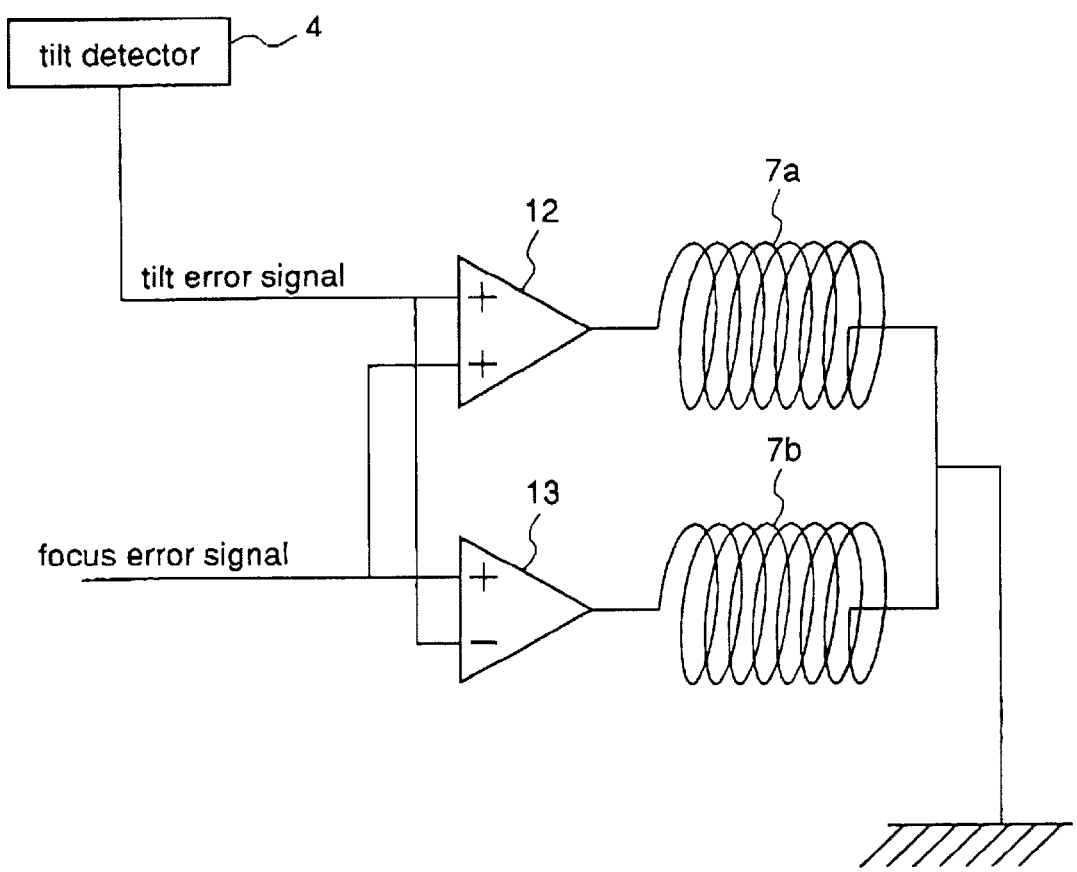
FIG. 15 is a block diagram illustrating a circuit for driving the movable member in the focusing direction and the tilt direction, employed for the objective lens driver according to the third embodiment.

FIG. 15 is a block diagram illustrating a circuit for driving the movable member 20 in the focusing direction and the tilt direction, employed for the objective lens driver according to the third embodiment.

In FIG. 15, reference numeral 10 designates a tilt detector for detecting an error of relative angle of the disk and the objective lens and generating a tilt error signal. Reference numeral 12 designates a normal rotation driving amplifier for adding the tilt error signal and a focus error signal which is output from a focusing detector (not shown) and shows a distance error between the disk and the objective lens. Reference numeral 13 designates a reverse rotation driving amplifier for subtracting the tilt error signal from the focus error signal. The tilt detector 4, the normal rotation driving amplifier 12, the reverse rotation driving amplifier 13, and the focusing detector are housed in an optical unit (not shown) which is disposed on the back of the fixed base 36 shown in FIG. 13. It is not always necessary for the tilt detector 4 to detect the relative angle of the disk and the optical axis of the objective lens. It may detect a numeric value relating to a tilt and generate a tilt error signal on the basis of the value. In this third embodiment, the tilt detector 4 detects a jitter value of signal obtained when data is reproduced from the disk, and outputs a signal that minimizes the jitter value detected, as a tilt error signal. When tilt detection is carried out on the basis of a jitter value as mentioned above, it is not necessary to feed the movable, member 20 through the wire members for tilt detection and, therefore, the supporting plate 33 can be shaped as desired.

A description is now given of the operation of the objective lens driver so constructed.

Initially, the operation for driving the movable member 20 in the focusing direction will be described using FIGS. 13 to 15. It is premised that no tilt is generated.

When a focus error signal is detected, the normal rotation driving amplifier 12 and the reverse rotation driving amplifier 13 output the focus error signal toward the focusing coil 7a and the focusing coil 7b, respectively. Then, electromagnetic forces in the focusing direction F are generated between the currents (focus error signals) flowing through the focusing coils 7a and 7b and the magnetic fluxes passing through the first and second permanent magnets 3a and 3b and the corresponding yokes 31a and 31b, respectively, and the electromagnetic forces so generated are received by the first and second permanent: magnets 3a and 3b, respectively, whereby the movable member 20 moves almost translationally in the focusing direction F while being supported by the wire members 8a to 8d. In this way, the movable member 20 is driven in the focusing direction F.

Next, the operation for driving the movable member 20 in the tracking direction T will be described using FIGS. 13, 14, and 16.

Figure 16:
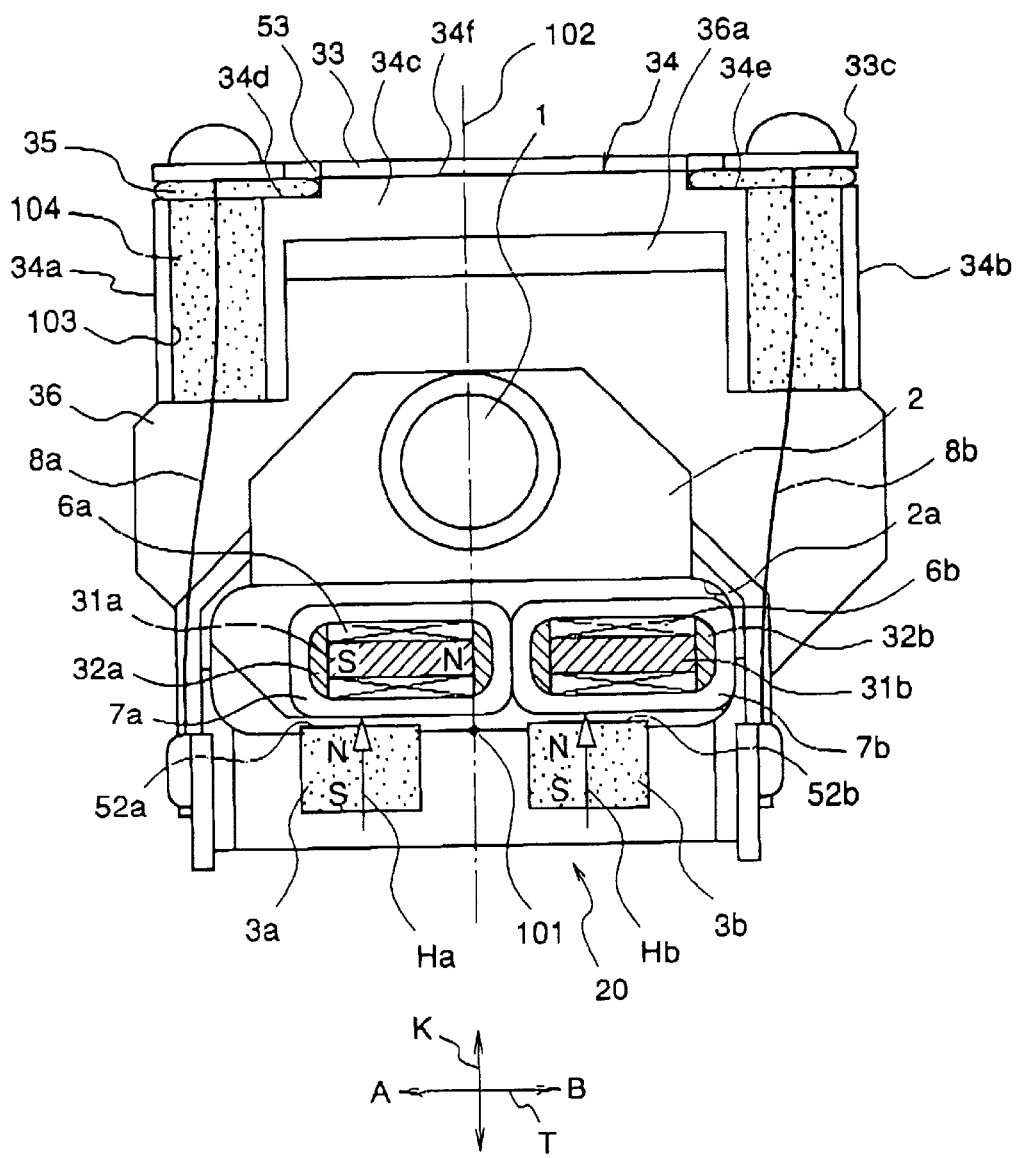
FIG. 16 is a plan view for explaining the operation of driving the movable member in the tracking direction in the objective lens driver according to the third embodiment.

FIG. 16 is a schematic plan view for explaining the movable member driving operation of the objective lens driver in the tracking direction. FIG. 16 shows the state where the movable member 20 is in the maximum position within the movable range of the movable member in the tracking direction. The bobbins 32a and 32b are shown in transverse cross sections, and the holding member 34 is perspectively shown.

When a tracking error signal is generated, this tracking error signal is input to the tracking coils 6a and 6b, and electromagnetic forces in the tracking direction T are generated between the currents (tracking error signals) flowing through the tracking coils 6a and 6b and the magnetic fluxes passing through the first and second permanent magnets 3a and 3b and the corresponding yokes 31a and 31b, respectively. The electromagnetic forces so generated are received by the first and second permanent magnets 3a and 3b, respectively, whereby the movable member 20 moves almost translationally in the tracking direction T while being supported by the wire members 8a to 8d. In this way, the movable member 20 is driven in the tracking direction T.

Furthermore, as shown in FIG. 16, even when the movable member 20 is driven toward A in the tracking direction T to reach the position where the focusing coil 7b of the second bobbin 32b abuts the internal surface of the window 2a of the lens holder 2, i.e., the maximum position in the movable range in the direction A, the magnetic path of the magnetic circuit produced by the first permanent magnet 3a and the yoke 31a is not coupled with the magnetic path of the magnetic circuit produced by the second permanent magnet 3b and the yoke 31b, because the first and second permanent magnets 3a and 3b are arranged with their pole faces 52a and 52b having the same polarity and, furthermore, the first permanent magnet 3a magnetizes the yoke 31a so that the end of the yoke 31a in the direction B becomes the N (negative) pole while the pole face 52b of the second permanent magnet 3b positioned in the vicinity of the N pole of the yoke 31a is the N pole. The same may be said of the case where the movable member 20 is driven in the direction B of the tracking direction T. Accordingly, in servo control along the tracking direction T, there is only one stability point determined by the spring constants of the wire members 8a to 8d and the spring constants of the magnetic springs between the permanent magnets 3a and 3b and the yokes 31a and 31b, respectively, resulting in stable servo control.

Next, the operation for driving the movable member 20 in the tilt direction will be described using FIGS. 13 to 15.

When an error of relative angle of the disk 10 and the optical axis J of the objective lens 1 is generated, the tilt detector 4 outputs a tilt error signal according to the relative angle error generated. Receiving the tilt error signal, the normal rotation driving amplifier 12 adds the tilt error signal to the focus error signal and then outputs the adding result toward the focusing coil 7a of the first bobbin 32a. On the other hand, receiving the tilt error signal, the reverse rotation driving amplifier 13 subtracts the tilt error signal from the focus error signal and then outputs the subtracting result toward the focusing coil 7b of the second bobbin 32b. Thereby, a difference corresponding to the tilt error signal is generated between the electromagnetic force in the focusing direction F generated by the focusing coil 7a of the first bobbin 32a and the electromagnetic force in the focusing direction F generated by the focusing coil 7b of the second bobbin 32b. Receiving the electromagnetic forces having the difference, a moment according to the tilt error signal is generated between the first permanent magnet 3a and the second permanent magnet 3b and, by the moment, the movable member 20 is rotated on the center of gravity 101 in the tilt direction R, whereby the angle error of the disk 10 and the optical axis J of the objective lens 1 is corrected. In this third embodiment, since the tilt error signal is generated on the basis of the jitter value, the tilt correction on the basis of the tilt error signal results in that the jitter is improved more than the degradation in jitter due to the tilt.

A description is now given of the function of the supporting plate 33 using FIGS. 13 and 14.

In FIGS. 13 and 14, the metal plate 33 supporting ends of the wire members 8a to 8d is elastically deformable in the longitudinal direction of the wire members 8a to 8d. So, the spring constant in the longitudinal direction of the wire members 8a to 8d is equal to the spring constant of the spring connecting the supporting plate 33 and the wire members 8a to 8d in series and, therefore, there is provided a spring structure different from the spring structure in the low-order resonance mode. Therefore, regardless of the resonance frequency in the low-order resonance mode, frequency shifting of unnecessary resonance in the longitudinal direction of the wire members 8a to 8d is possible. Further, since the viscoelastic material 35 which is disposed contacting the movable portions 33a to 33d of the supporting plate 33 is deformable in the tensile direction or the compressive direction, resonance suppressing effect with a high attenuation factor is realized. Moreover, since the supporting plate 33 is made of a metal, the characteristics thereof are not degraded with the temperature change or the lapse of time.

In this third embodiment, in order to detect a tilt, the tilt detector 4 detects a jitter value. However, tilt detection is not restricted thereto, and any means may be employed as long as it can detect the relative angle of the disk 10 and the optical axis J of the objective lens 1. For example, a tilt may be detected using a reflection type optical sensor mounted on the movable member 20. In this case, the optical sensor is fed through the wire members 8a to 8d, or a feeding wire is connected to the optical sensor. Further, a reflection type optical sensor may be mounted on the base 51, and a portion of light beam for recording/reproduction may be used in place of a light emitting part of the reflection type optical sensor. In this case, further reduction in weight and further simplification in structure are realized with the same effects as mentioned above.

Further, although the direction of gravity applied to the objective lens driver, i.e., the attitude of the objective lens driver, is not specified in the above description, the objective lens driver according to the present invention can provide the same effects as mentioned above regardless of the direction of gravity.

As described above, in the objective lens driver according to the third embodiment of the invention, the first and second permanent magnets 3a and 3b are mounted on the movable member 20, while the yokes 31a and 31b, the tracking coils 6a and 6b, and the focusing coils 7a and 7b, which are electromagnetic force generating means, are mounted on the base 51. Ends of the wire members 8a to 8d supporting the movable member 20 are supported by the metal plate 33 being an elastic supporting plate so that the wire members are elastically movable in the tangent direction K, and vibration of the supporting plate 33 is attenuated by the viscoelastic material 35. In this structure, since the elastic supporting plate 33 is made of a metal, the characteristics thereof are not degraded with the temperature change or the lapse of time, resulting in highly reliable resonance suppressing effect. Further, since the first and second permanent magnets 3a and 3b are mounted on the movable member 20, it is not necessary to feed the movable member 20 through the wire members 8a to 8d to drive the movable member 20 and, therefore, it is not necessary to electrically insulating the wire members 8a to 8d from each other by the elastic supporting plate 33. So, even though the supporting plate 33 is made of a metal, the shape of the supporting plate 33 can be made optimum for preventing the resonance of the wire members 8a to 8d. Moreover, since the shapes and assembly of parts, such as the wire members 8a to 8d and the supporting plate 33, are simple, tear of these parts or curvature of the wire members 8a to 8d hardly occur during the assembly, resulting in a stable assembly.

Furthermore, the objective lens driver according to the third embodiment is equipped with two permanent magnets 3a and 3b, two yokes 31a and 31b, and two focusing coils 7a and 7b, which are arranged symmetrically about the symmetry plane 102 passing the center of gravity 101 of the movable member 20 and being parallel to the focusing direction F and the tangent direction K, and the movable member 20 is driven in the tilt direction K as well as in the focusing direction F and the tracking direction T. In this structure, since the permanent magnets 3a and 3b on the movable member 20 are magnetized in the same direction (Ha, Hb), even when the movable member 20 moves in the tracking direction T to reach the position where one of the two permanent magnets 3a and 3b is close to the yoke facing the other permanent magnet, the magnetic path of the magnetic circuit constituted by the former permanent magnet and the corresponding yoke is not coupled with the magnetic path of the magnetic circuit constituted by the latter permanent magnet and the corresponding yoke. Accordingly, there is only one stability point determined by the spring constants of the wire members 8a to 8d and the spring constants of the magnetic springs between the permanent magnets 3a and 3b and the yokes 31a and 31b, respectively, whereby the linearity of current sensitivity characteristics is ensured, resulting in an objective lens driver capable of providing stable servo characteristics and driving the objective lens in the tilt direction. Furthermore, in the objective lens driver capable of driving the objective lens in the tilt direction, it is possible to prevent, with high reliability, unnecessary resonance that is likely to occur when the objective lens is driven in the tilt direction R and in the focusing direction F or the tracking direction T simultaneously, whereby more stable servo characteristics are realized.

Moreover, in this third embodiment, the base 51 comprises the holding member 34 made of resin, on which the supporting plate 33 is disposed, and the fixed base 36 made of metal, on which the yokes 31a and 31b, the tracking coils 6a and 6b, and the focusing coils 7a and 7b are disposed. The holding member 34 is formed by insert molding using the supporting plate 33 and the fixed base 36. Therefore, it is possible to avoid variations in characteristics due to uneven application of adhesive when the supporting plate 33, the holding member 34, and the fixed base 36 are united using adhesive, so that the manpower can be reduced as compared with the case of using adhesive.

Embodiment 4

Figure 17:
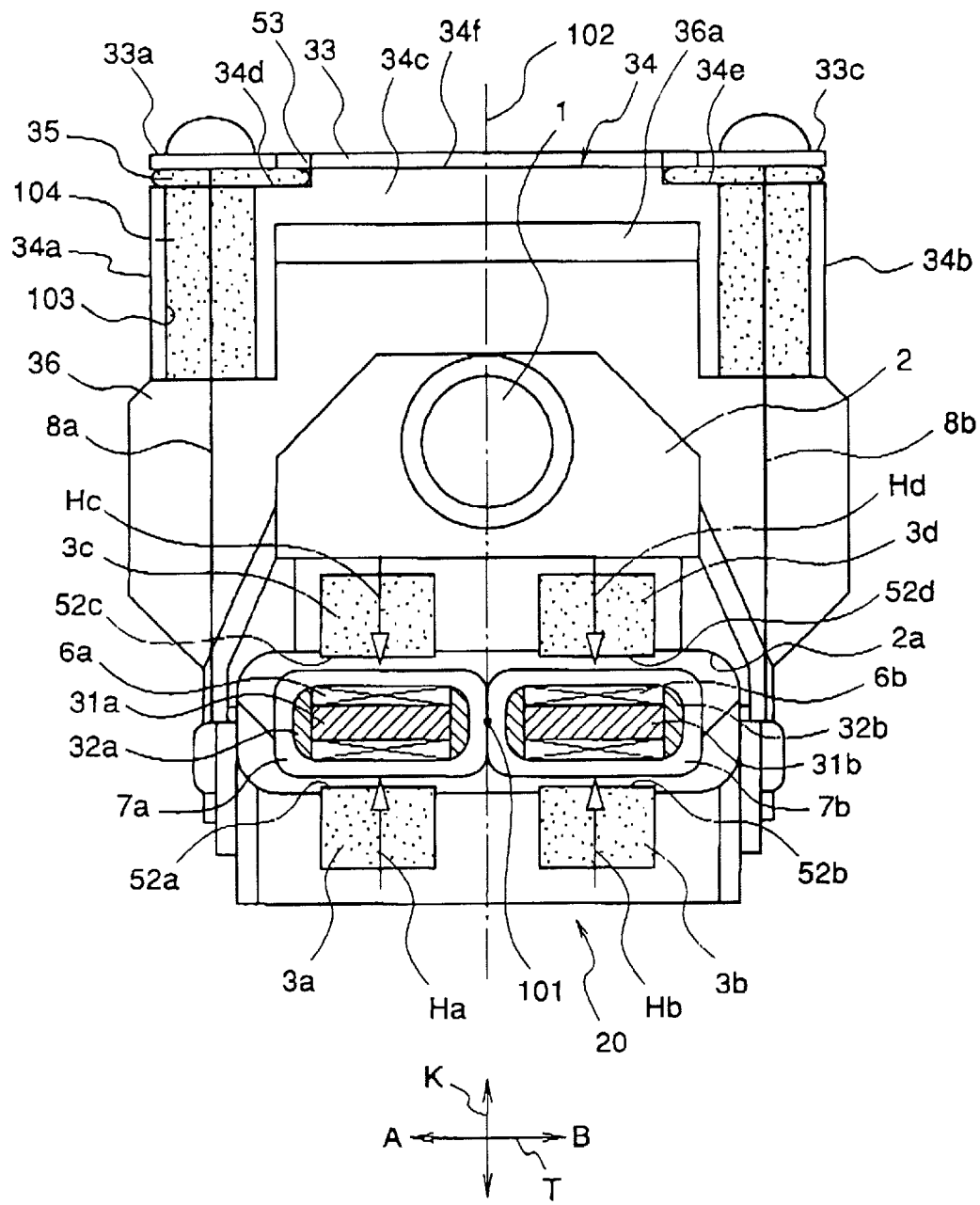
FIG. 17 is a plan view schematically illustrating an objective lens driver according to a fourth embodiment of the invention.

FIG. 17 is a plan view schematically showing an objective lens driver according to a fourth embodiment of the invention. FIG. 17 shows the state where the movable member 20 is not driven. The bobbins 32a and 32b are shown in transverse cross sections, and the holding member 34 is shown perspectively.

In FIG. 17, the same reference numerals as those shown in FIG. 14 designate the same or corresponding parts. The objective lens driver according to this fourth embodiment is different from the objective lens driver according to the third embodiment in that the first and second permanent magnets 3a and 3b are disposed on one side of the yokes 31a and 31b of the first and second bobbins 32a and 32b on the fixed base 36 in the tangent direction, respectively, while third and fourth permanent magnets 3c and 3d are disposed on the other side of the yokes 31a and 31b, respectively.

To be specific, the first bobbin 32a and the second bobbin 32b are disposed so that the respective yokes 31a and 31b thereof are located in the center of the window 2a of the lens holder 2 in the tangent direction K, which window has opposed longitudinal sides in the tracking direction T. Along the opposed longitudinal sides of the window 2a of the lens holder 2, a pair to the first permanent magnet 3a and the third permanent magnet 3c and a pair of the second permanent magnet 3b and the fourth permanent magnet 3d are disposed symmetrically about the symmetry plane 102. The first permanent magnet 3a and the third permanent magnet 3c are disposed with their pole faces 52a and 52c facing the yoke 31a of the first bobbin 32a, and the second permanent magnet 3b and the fourth permanent magnet 3d are disposed with their pole faces 52b and 52d facing the yoke 31b of the second bobbin 32b. Further, the directions of magnetization of two permanent magnets facing each other across the bobbin, i.e., the directions Ha and Hc (Hb and Hd) of the first permanent magnet 3a and the third permanent magnet 3c (the second permanent magnet 3b and the fourth permanent magnet 3d) are opposed to each other. The directions of magnetization of two permanent magnets disposed side by side in the tracking direction T, i.e., the directions Ha and Hb (Hc and Hd) of the first permanent magnet 3a and the second permanent magnet 3b (the third permanent magnet 3c and the fourth permanent magnet 3d) are identical.

Moreover, the supporting center of the wire members 8a to 8d for supporting the movable member 20 and the driving center of the first to fourth permanent magnets 3a to 3d for driving the movable member 20 are in approximate agreement with the center of gravity 101 of the movable member 20.

In the objective lens driver so constructed, the four permanent magnets 3a to 3d on the movable member 20 are located on both sides of the yokes 31a and 31b in the tangent direction K in such a manner that the pole faces 52a and 52c of the first and third magnets 3a and 3c (the pole faces 52b and 52d of the second and fourth magnets 3b and 3d) face each other across the yoke 31a (31b) and have the same polarity. Therefore, the magnetic fluxes generated by the permanent magnets 3a and 3c (3b and 3d) are interlinked with the focusing coil 7a (7b) and the tracking coil 6a (6b) from both sides of the coils 7a and 6a (7b and 6b). Thereby, the effective coil lengths of the focusing coil 7a (7b) and the tracking coil 6a (6b), which function effectively to driving of the movable member 20, are doubled. Therefore, a high-power driving force is obtained and the current sensitivity is improved, resulting in a reduction in power consumption.

Figure 18:
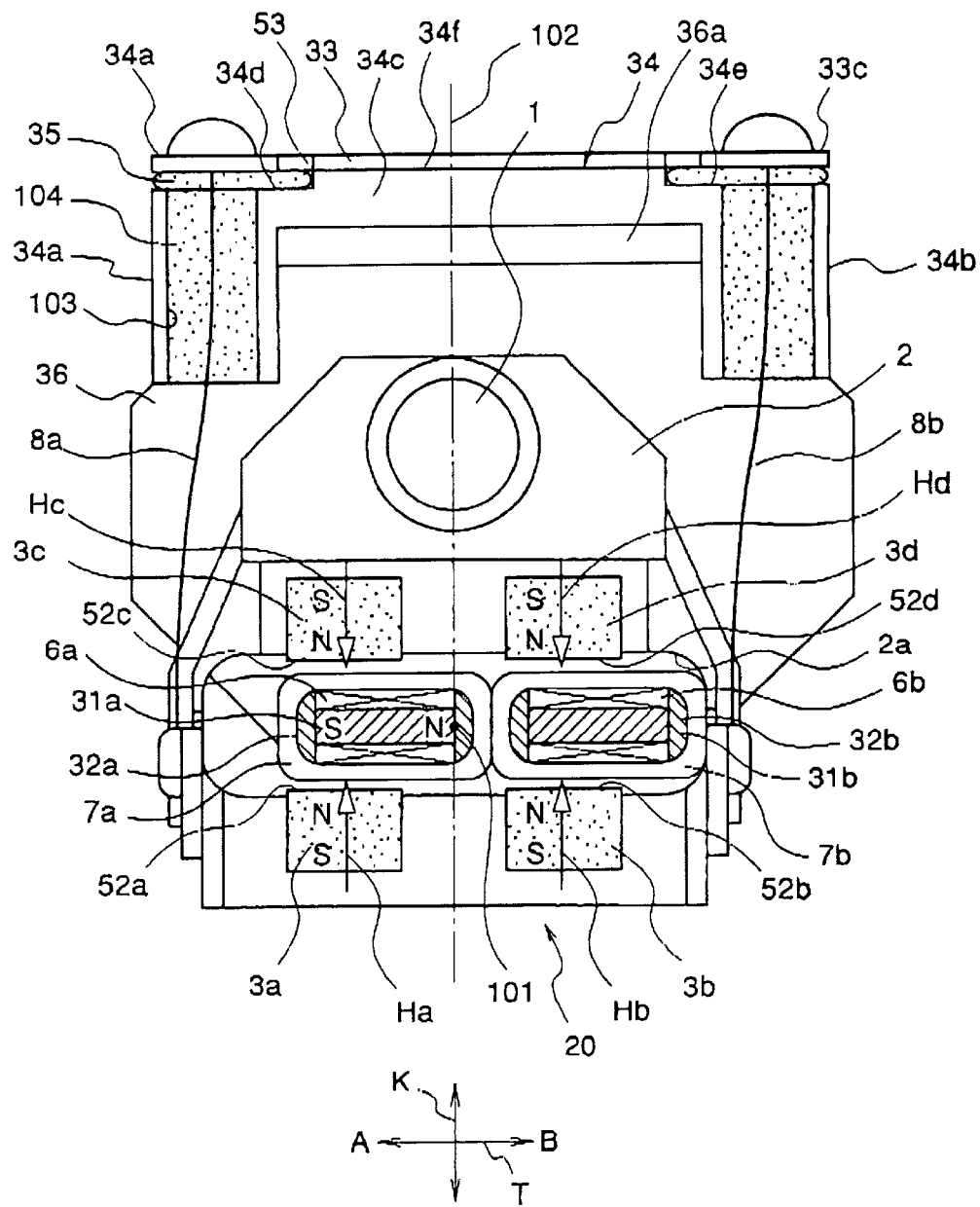
FIG. 18 is a plan view for explaining the operation of driving the movable member in the tracking direction in the objective lens driver according to the fourth embodiment.

Furthermore, as shown in FIG. 18, even when the movable member 20 is driven in the tracking direction T to reach the maximum position in the movable range thereof, the magnetic path of the magnetic circuit produced by the first and third permanent magnets 3a and 3c and the yoke 31a is not coupled with the magnetic path of the magnetic circuit produced by the second and fourth permanent magnets 3b and 3d and the yoke 31b. The reason is as follows. The permanent magnets disposed side by side in the tracking direction T, i.e., the first and second magnets 3a and 3b (the third and fourth magnets 3c and 3d), have the pole faces 52a and 52b (52c and 52d) of the same polarity, and the first and third magnets 3a and 3c magnetize the yoke 31a so that the end of the yoke 31a in the direction B becomes the N (negative) pole, while the pole faces 52b and 52d of the second and fourth magnets 3b and 3d positioned in the vicinity of the N pole of the yoke 31a are the N pole. Although FIG. 18 shows the case where the movable member 20 is driven in the direction A, the same as above may be said of the case where the movable member 20 is driven in the direction B. Accordingly, in servo control along the tracking direction T, there is only one stability point determined by the spring constants of the wire members 8a to 8d and the spring constants of the magnetic springs between the permanent magnets 3a and 3b and the yokes 31a and 31b, respectively, whereby stable servo control is ensured. As a result, an objective lens driver capable of driving the objective lens in the tilt direction is realized with reduced power consumption and stable servo characteristics.

In this fourth embodiment, an elastic supporting plate comprising a damping material may be used in place of the supporting metal plate and the viscoelastic material for the supporting metal plate.

Although in the third and fourth embodiments tilt drive is performed by applying the superposed focus error signal and tilt error signal to the focusing coils, tilt drive may be performed by using tilt driving coils and applying a tilt error signal to the tilt driving coils.

What is claimed is:

1. An objective lens driver used for recording and/or reproduction of optical information on a disk type recording medium, comprising:
   a movable member comprising:
      an objective lens having, when being not driven, an optical axis in a focusing direction that is perpendicular to the disk type recording medium;
      a lens holder holding the objective lens; and
      at least one permanent magnet fixed onto the lens holder, having a direction of magnetization in a tangent direction that is perpendicular to the focusing direction and to a tracking direction parallel to the radius of the disk type recording medium;
   a plurality of rod-shaped elastic supporting members, each supporting the movable member at an end thereof so that the movable member can move in the focusing direction and the tracking direction and rotate in a tilt direction that is a rotative direction around the tangent direction;
   a fixed base to which the other ends of the rod-shaped elastic supporting members are connected;
   means for driving the movable member in the focusing direction, the tracking direction, and the tilt direction by interaction with the permanent magnet, said driving means comprising:
      at least two yokes comprising a magnetic material, disposed on the fixed base and facing the permanent magnet in the tangent direction;
      at least one focusing coil winding round each yoke with its winding axis in the focusing direction;
      at least one tracking coil winding round each yoke with its winding axis in the tracking direction; and
      at least one tilt driving coil winding round each yoke with its winding axis in the focusing direction;
   wherein said two yokes are arranged almost symmetrically about a plane including the center of gravity of the movable member in its not-driven state and being perpendicular to the tracking direction, and said tilt driving coils around the two yokes are arranged almost symmetrically about said plane.

2. An objective lens driver used for recording and/or reproduction of optical information on a disk type recording medium, comprising:
   a movable member comprising:
      an objective lens having, when being not driven, an optical axis in a focusing direction that is perpendicular to the disk type recording medium;
      a lens holder holding the objective lens; and
      at least two permanent magnets fixed onto the lens holder, each magnet having a direction of magnetization in a tangent direction that is perpendicular to the focusing direction and to a tracking direction parallel to the radius of the disk type recording medium;
   a plurality of rod-shaped elastic supporting members, each supporting the movable member at an end thereof so that the movable member can move in the focusing direction and the tracking direction and rotate in a tilt direction that is a rotative direction around the tangent direction;
   a fixed base to which the other ends of the rod-shaped elastic supporting members are connected;
   means for driving the movable member in the focusing direction, the tracking direction, and the tilt direction by interaction with the permanent magnets, said driving means comprising:
      at least two yokes comprising a magnetic material, disposed on the fixed base and facing the two permanent magnets, one to one, in the tangent direction;
      at least one focusing coil winding round each yoke with its winding axis in the focusing direction;
      at least one tracking coil winding round each yoke with its winding axis in the tracking direction; and
      at least one tilt driving coil winding round each yoke with its winding axis in the focusing direction;
   wherein said two permanent magnets are arranged almost symmetrically about a plane including the center of gravity of the movable member in its not-driven state and being perpendicular to the tracking direction, said two yokes are arranged almost symmetrically about said plane, and said two tilt driving coils around the two yokes are arranged almost symmetrically about said plane.

3. The objective lens driver of claim 2 further comprising additional permanent magnets which are located in positions opposed to said permanent magnets across said yokes, on the lens holder in the not-driven state, so that said additional permanent magnets face said yokes at their pole faces having the same polarity as the pole faces of said permanent magnets.

4. The objective lens driver of claim 1 wherein said permanent magnets, which are arranged almost symmetrically about said plane including the center of gravity of the movable member and being perpendicular to the tracking direction, have the same direction of magnetization.

5. The objective lens driver of claim 2 wherein said permanent magnets, which are arranged almost symmetrically about said plane including the center of gravity of the movable member and being perpendicular to the tracking direction, have the same direction of magnetization.

6. The objective lens driver of claim 3 wherein said permanent magnets, which are arranged almost symmetrically about said plane including the center of gravity of the movable member and being perpendicular to the tracking direction, have the same direction of magnetization.

7. The objective lens driver of claim 1 wherein said focusing coils also serve as said tilt driving coils, further comprising:

tilt detection means for detecting a tilt of the optical axis of the objective lens relative to the disk type recording medium and outputting said tilt as a tilt driving signal; and tilt control means for receiving the tilt driving signal output from the tilt detecting means and a focusing drive signal, supplied from the outside, for locating the objective lens in the focusing direction relative to the disk type recording medium, and superposing the focusing drive signal on the tilt driving signal, and outputting the superposed signals toward the focusing coils.

8. The objective lens driver of claim 2 wherein said focusing coils also serve as said tilt driving coils, further comprising:

tilt detection means for detecting a tilt of the optical axis of the objective lens relative to the disk type recording medium and outputting said tilt as a tilt driving signal; and tilt control means for receiving the tilt driving signal output from tho tilt detecting means and a focusing drive signal, supplied from the outside, for locating the objective lens in the focusing direction relative to the disk type recording medium, and superposing the focusing drive signal on the tilt driving signal, and outputting the superposed signals toward the focusing coils.

9. The objective lens driver of claim 3 wherein said focusing coils also serve as said tilt driving coils, further comprising:

tilt detection means for detecting a tilt of the optical axis of the objective lens relative to the disk type recording medium and outputting said tilt as a tilt driving signal; and tilt control means for receiving the tilt driving signal output from the tilt detecting means and a focusing drive signal, supplied from the outside, for locating the objective lens in the focusing direction relative to the disk type recording medium, and superposing the focusing drive signal on the tilt driving signal, and outputting the superposed signals toward the focusing coils.

10. The objective lens driver of claim 1 wherein the number of said rod-shaped elastic supporting members is four.

11. The objective lens driver of claim 2 wherein the number of said rod-shaped elastic supporting members is four.

12. The objective lens driver of claim 3 wherein the number of said rod-shaped elastic supporting members is four.

13. The objective lens driver of claim 10 wherein the centroid of a quadrilateral made by four points at which the four rod-shaped elastic supporting members support the movable member, a middle point of a segment connecting the centroids of pole faces of the permanent magnets arranged almost symmetrically about said plane including the center of gravity of the movable member and being perpendicular to the tracking direction, and the center of gravity of the movable member are in approximate agreement with each other on a straight line extending in the tangent direction.

14. The objective lens driver of claim 11 wherein the centroid of a quadrilateral made by four points at which the four rod-shaped elastic supporting members support the movable member, a middle point of a segment connecting the centroids of pole faces of the permanent magnets arranged almost symmetrically about said plane including the center of gravity of the movable member and being perpendicular to the tracking direction, and the center of gravity of the movable member are in approximate agreement with each other on a straight line extending in the tangent direction.

15. The objective lens driver of claim 12 wherein the centroid of a quadrilateral made by four points at which the four rod-shaped elastic supporting members support the movable member, a middle point of a segment connecting the centroids of pole faces of the permanent magnets arranged almost symmetrically about said plane including the center of gravity of the movable member and being perpendicular to the tracking direction, and the center of gravity of the movable member are in approximate agreement with each other on a straight line extending in the tangent direction.

16. The objective lens driver of claim 13 wherein said straight line extending in the tangent direction orthogonally crosses the optical axis of the objective lens.

17. The objective lens driver of claim 14 wherein said straight line extending in the tangent direction orthogonally crosses the optical axis of the objective lens.

18. The objective lens driver of claim 15 wherein said straight line extending in the tangent direction orthogonally crosses the optical axis of the objective lens.

* * * * *